(12) United States Patent
Tsang

(10) Patent No.: US 9,773,128 B2
(45) Date of Patent: Sep. 26, 2017

(54) HOLOGRAPHIC ENCRYPTION OF MULTI-DIMENSIONAL IMAGES

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 46 days.

(21) Appl. No.: 14/516,332

(22) Filed: Oct. 16, 2014

(65) Prior Publication Data

US 2016/0110564 A1    Apr. 21, 2016

(51) Int. Cl.
*G06F 21/00* (2013.01)
*H04L 29/06* (2006.01)
(Continued)

(52) U.S. Cl.
CPC ........... *G06F 21/72* (2013.01); *G03H 1/0005* (2013.01); *G03H 1/0011* (2013.01); *G03H 1/08* (2013.01);
(Continued)

(58) Field of Classification Search
CPC ... G06F 21/72; G06F 2221/2107; G03H 1/04; G03H 1/08; G03H 1/0005; G03H 2001/0022; G03H 1/0011; G09C 5/00
See application file for complete search history.

(56) References Cited

U.S. PATENT DOCUMENTS 5,194,971 A   3/1993  Haines
5,483,364 A   1/1996  Ishimoto et al.
(Continued)

FOREIGN PATENT DOCUMENTS

CN  102087503 A   6/2011
CN  102087503 B   7/2012
(Continued)

OTHER PUBLICATIONS

Dezhao Kong; Liangcai Cao; Hao Zhang; Qingsheng He; Guofan Jin; "Holographic lensless interference encryption based on single spatial light modulator"; 2016 IEEE 14th International Conference on Industrial Informatics (INDIN); Year: Feb. 2016; pp. 562-566.*
(Continued)

*Primary Examiner* — Shewaye Gelagay
*Assistant Examiner* — Courtney Fields
(74) *Attorney, Agent, or Firm* — Amin, Turocy & Watson, LLP

(57) ABSTRACT

Cryptographic techniques for encrypting images, and decrypting and reconstructing images, are provided to facilitate preventing unauthorized access to images. A holographic cryptographic component (HCC) can generate a global image comprising a scaled version of a source image and random content, generate a phase hologram representing the global image, and encrypt the phase hologram to generate an encrypted hologram based on a random phase mask, which can be the private encryption key. To reconstruct the source image, an HCC can overlay a phase mask, which can be a conjugate of the random phase mask, on the encrypted hologram to decrypt it, and can illuminate the decrypted hologram with a coherent light source. The source image is only reconstructed properly if the correct phase mask is used. If HCC applies the encryption process repetitively to the same source image, HCC can generate a different encrypted hologram in each run.

28 Claims, 14 Drawing Sheets

(51) Int. Cl.
G06F 21/72 (2013.01)
G03H 1/00 (2006.01)
G03H 1/08 (2006.01)
G09C 5/00 (2006.01)
G03H 1/02 (2006.01)
G03H 1/04 (2006.01)

(52) U.S. Cl.
CPC ........ *G09C 5/00* (2013.01); *G03H 2001/0022* (2013.01); *G06F 2221/2107* (2013.01)

(56) References Cited

U.S. PATENT DOCUMENTS

| | | | |
|---|---|---|---|
| 5,696,601 A | 12/1997 | Metcalfe et al. | |
| 5,974,228 A | 10/1999 | Heitsch | |
| 7,088,480 B1 | 8/2006 | Javidi et al. | |
| 7,212,630 B2 | 5/2007 | Javidi | |
| 7,221,760 B2 | 5/2007 | Javidi et al. | |
| 8,150,033 B2 | 4/2012 | Javidi et al. | |
| 8,274,705 B2 | 9/2012 | Chang | |
| RE43,707 E | 10/2012 | Kimpe et al. | |
| 8,320,694 B2 | 11/2012 | Chang | |
| 8,384,973 B2 | 2/2013 | Leister | |
| 8,654,048 B2 | 2/2014 | Collings et al. | |
| 2004/0255236 A1* | 12/2004 | Collart | G11B 19/022 715/229 |
| 2005/0041746 A1* | 2/2005 | Rosen | H04B 1/7163 375/242 |
| 2005/0122549 A1 | 6/2005 | Goulanian et al. | |
| 2006/0001921 A1 | 1/2006 | Bailey et al. | |
| 2006/0078113 A1* | 4/2006 | Javidi | G03H 1/0866 380/210 |
| 2007/0024999 A1 | 2/2007 | Crossland et al. | |
| 2007/0086662 A1 | 4/2007 | Cho et al. | |
| 2008/0218864 A1 | 9/2008 | Javidi | |
| 2009/0002787 A1 | 1/2009 | Cable et al. | |
| 2009/0207466 A1 | 8/2009 | Bucklay | |
| 2009/0219380 A1* | 9/2009 | Cable | G03H 1/0808 348/40 |
| 2010/0085276 A1 | 4/2010 | Cable | |
| 2010/0149139 A1* | 6/2010 | Kroll | G02B 26/0875 345/204 |
| 2011/0228365 A1 | 9/2011 | Tsang et al. | |
| 2011/0261427 A1 | 10/2011 | Hart et al. | |
| 2012/0008181 A1 | 1/2012 | Cable et al. | |
| 2013/0265623 A1* | 10/2013 | Sugiyama | G02B 27/0172 359/13 |

FOREIGN PATENT DOCUMENTS

| | | | | |
|---|---|---|---|---|
| CN | 103279916 A | 9/2013 | | |
| DE | WO 2009121709 A1 * | 10/2009 | ............... | G03H 1/04 |
| WO | 2005059660 A2 | 6/2005 | | |
| WO | 2005059881 | 6/2005 | | |
| WO | 2005059881 A2 | 6/2005 | | |
| WO | 2006134404 | 12/2006 | | |
| WO | 2006134404 A1 | 12/2006 | | |

OTHER PUBLICATIONS

U.S. Appl. No. 11/867,570, filed Oct. 4, 2007, Javidi.
Tudela et al. "Full complex Fresnel holograms displayed on liquid crystal devices." Journal of Optics A: Pure and Applied Optics, Institute of Physics Publishing, J. Opt. A: Pure Appl. Opt. 5 (2003), Jan. 17, 2003, S1-S6.
Hsieh et al. "Improvement of the complex modulated characteristic of cascaded liquid crystal spatial light modulations by using a novel amplitude compensated technique." OE Letters, Optical Engineering, Jul. 2007/vol. 46(7), Jul. 2, 2007, 3 pages.
Makowski et al. "Complex light modulation for lensless image projection." Chinese Optics Letters, col. 9(12), 120008(2011), Dec. 10, 2011, 3 pages.
Hsueh, et al. "Computer-generated double-phase holograms" published in Applied Optics; Dec. 15, 1978, 10 pages.
Reichelt et al. "Full-range, complex spatial light modulator for real-time holography." Optics Letters vol. 37, No. 11, Jun. 1, 2012, pp. 1955-1957.
Li et al. "Color holographic display using a phase-only spatial light modulator."Digital Holography and 3D Imaging, Technical Digest, Apr. 21-25, 2013, 3 pages.
Song et al. "Optimal synthesis of double-phase computer generated holograms using a phase-only spatial light modulator with grating filter." Optics Express vol. 20, No. 28, Dec. 31, 2012, 10 pages.
Liu et al. "Complex Fresnel hologram display using a single SLM," Applied Optics, vol. 50, No. 34, Dec. 1, 2011, pp. 128-135.
Tsang, et al. "Novel method for converting digital Fresnel hologram to phase-only hologram based on bidirectional error diffusion", Optics Express, Oct. 7, 2013, 7 pages.
Yeom et al. "Phase-only hologram generation based on integral imaging and its enhancement in depth resolution." Chinese Optics Letters, col. 9(12), Dec. 10, 2011, 4 pages.
Buckley. "Holographic Laser Projection Technology." SID International Symposium Digest of Technical Papers 2008, pp. 1074-1079.
Cable et al. "Real-time Binary Hologram Generation for High-quality Video Projection Applications." SID International Symposium Digest of Technical Papers 2004, pp. 1431-1433.
Buckley. "Real-Time Error Diffusion for Signal-to-Noise Ratio Improvement in a Holographic Projection System." Journal of Display Technology, vol. 7, No. 2, Feb. 2011, pp. 70-76.
Wikipedia. "Floyd-Steinberg Dithering" published online at [http://en.wikipedia.org/wiki/Floyd%E2%80%93Steinberg_dithering], last modified on Oct. 23, 2014, retrieved on Feb. 4, 2015, 2 pages.
Gerchberg et al. "A Practical Algorithm for the Determination of Phase from Image and Diffraction Plane Pictures." OPTIK, vol. 35 (No. 2), Received Nov. 29, 1971, pp. 237-246.
Weng et al. "Generation of real-time large computer generated hologram using wavefront recording method."Optics Express, vol. 20, No. 4, Feb. 13, 2012, pp. 4018-4023.
Tsang et al. "Holographic video at 40 frames per second for 4-million object points." Optics Express, vol. 19, No. 16, Aug. 1, 2011, pp. 15205-15211.
Tsang, et al., "Novel method for converting digital Fresnel hologram to phase-only hologram based on bidirectional error diffusion," Optics Express, vol. 21, No. 20, Oct. 7, 2013, pp. 23680-23686.
Tashima, et al., "Known plaintext attack on double random phase encoding using fingerprint as key and a method for avoiding the attack," Jun. 21, 2010 / vol. 18, No. 13 / Optics Express / pp. 13772-13781.
Peng, et al. "Known-plaintext attack on optical encryption based on double random phase keys," Optics Letters / vol. 31, No. 8 / Apr. 15, 2006 / pp. 1044-1046.
Situ, et al., "Double random-phase encoding in the Fresnel domain," Optics Letters / vol. 29, No. 14 / Jul. 15, 2004 / pp. 1584-1586.
Refregier, et al. "Optical image encryption based on input plane and Fourier plane random encoding," Apr. 1, 1995 / vol. 20, No. 7 / Optics Letters / pp. 767-769.
Unnikrishnan, et al. "Optical encryption by double-random phase encoding in the fractional Fourier domain," Jun. 15, 2000 / vol. 25, No. 12 / Optics Letters / pp. 887-889.
ISO/IEC. "Information technology—Automatic identification and data capture techniques—QR Code 2005 bar code symbology specification" ISO/IEC 18004: Second Edition—Sep. 1, 2006, Retrieved on Jan. 16, 2015, 124 pages.
Ren, et al. "Secure and noise-free holographic encryption with a quick-response code," Chin. Opt. Lett. 12, Jan. 10, 2014, 4 pages.
Barrera, et al., "Optical encryption and QR codes: Secure and noise-free information retrieval," Mar. 11, 2013 / vol. 21, No. 5 / Optics Express / pp. 5373-5378.
Zhang, et al. "Vulnerability to chosen-plaintext attack of a general optical encryption model with the architecture of scrambling-then-double random phase encoding," Optics Letters / vol. 38, No. 21 / Nov. 1, 2013, pp. 4506-4509.

(56) References Cited

OTHER PUBLICATIONS

Frauel, et al., "Resistance of the double random phase encryption against various attacks," Aug. 6, 2007 / vol. 15, No. 16 / Optics Express /pp. 10253-10265.
Carnicer, et al. "Vulnerability to chosen-cyphertext attacks of optical encryption schemes based on double random phase keys," Optics Letters / vol. 30, No. 13 / Jul. 1, 2005 / pp. 1644-1646.
Gong, et al. "Multiple-image encryption and authentication with sparse representation by space multiplexing," Applied Optics, vol. 52, No. 31, Nov. 1, 2013, pp. 7486-7493.
Chen, et al. "Optical color image encryption based on Arnold transform and interference method", Optics Communications 282 (2009) pp. 3680-3685.
Chen, et al. "Double random phase encoding using phase reservation and compression", J. Opt. 16 (2014) 025402 (7pp).
Non-Final Office Action dated Nov. 6, 2015 for U.S. Appl. No. 14/029,144, 29 pages.
Final Office Action dated Mar. 30, 2016 for U.S. Appl. No. 14/029,144, 22 pages.
Office Action dated Apr. 1, 2016 for U.S. Appl. No. 14/076,717, 44 pages.
Tsang et al. "Fast conversion of digital Fresnel hologram to phase-only hologram based on localized error diffusion and redistribution," Opt. Express 22, 5060-5066 (2014). Retrieved on Mar. 26, 2016, 7 pages.
Office Action dated Aug. 23, 2016 for U.S. Appl. No. 14/305,494, 112 pages.
Cathey, Jr., "Phase Holograms, Phase-Only Holograms, and Kinoforms", Dec. 1969. Retrieved on Aug. 23, 2016, 2 pages.
Falou, et al. "Segmented phase-only filter binarized with a new error diffusion approach", Journal of Optics A: Pure and Applied Optics, Feb. 11, 2005. Retrieved on Aug. 23, 2016, 10 pages.
Kiire, et al. "Three-dimensional displacement measurement for diffuse object using phase-shifting digital holography with polarization imaging camera", Optical Society of America, Dec. 1, 2011. Retrieved on Aug. 23, 2016, 6 pages.
Tsang, "Novel method for converting digital Fresnel hologram to phase-only hologram based on bidirectional error diffusion", Optics Express, Sep. 27, 2013. Retrieved on Aug. 23, 2016, 7 pages.
Knuth, "Digital Halftones by Dot Diffusion", ACM Transactions on Graphics, vol. 6, No. 4, Oct. 1987. Retrieved on Aug. 23, 2016, 29 pages.
Yagle, "Complex Numbers and Phasors", The University of Michigan, Ann Arbor, Fall 2005. Retrieved on Aug. 23, 2016, 7 pages.
Kirk, et al. "A generalisation of the error diffusion method for binary computer generated hologram design", Optics Communications 92 (1992) 12-18. Retrieved on Aug. 23, 2016, 8 pages.
Yeom, et al. "Phase-only hologram generation based on integral imaging and its enhancement in depth resolution", Chinese Optics Letters, Dec. 10, 2011. Retrieved on Aug. 23, 2016, 4 pages.

* cited by examiner

HOLOGRAPHIC ENCRYPTION OF MULTI-DIMENSIONAL IMAGES

TECHNICAL FIELD

The subject disclosure relates generally to holograms, e.g., to holographic encryption of multi-dimensional images.

BACKGROUND

Image encryption has been an area of interest for a number of decades, as it can protect pictorial content, which is dedicated to a targeted community, from being observed by unauthorized or illegitimate viewers. The technology of image encryption has found numerous important applications in, for example, consumer, industrial, commercial, communication, and military sectors. In general terms, the concept of an image encryption can be briefly explained as follows. In an encoder, a source image can be converted into a new form, which generally can be referred to as the ciphertext, with the incorporation of a secret encryption key. The key can be another image or can be a string of symbols. It is preferable that the ciphertext be significantly different from the source image, so that it is meaningless to anyone who observes it directly. In the decoder, the ciphertext can be reverted to the source image if the correct secret key, which can be exclusive owned, possessed, or used by legitimate viewers, is presented.

As the failure of an image encryption method can potentially inflict serious monetary loss and security breach, research on the developing of sophisticated image encryption methods has been conducted vigorously for many years. While developers have been working to come up with an encryption method wherein the secret encryption key cannot be revealed through some form of attacks, at the same time, there are a significant number of people, commonly referred to as the cryptanalysts, who are also attempting to develop methods for deducing the secret key of different image encryption methods through various kinds of attacks.

The emergence of digital holography, fueled by the recent advancement on the computing and the display technologies, has instigated a new direction in image encryption. Being different from a two-dimensional (2-D) optical image (such as one captured by a traditional camera), a hologram can be a 2-D complex image that can be capable of representing a three-dimensional (3-D) image. In general, a hologram image can be comprised of high frequency fringe patterns that can bear little clue on the pictorial content it represents. Due to this significant property relating to holograms, encryption of the hologram of a source image often can be more difficult to attack by cryptanalysts than the encryption of the source image directly. However, conventional holographic encryption techniques can suffer from a number of deficiencies or disadvantages, including, that images (e.g., reconstructed images) that have been reconstructed based on conventional holographic encryption techniques can be undesirably noisy, the cryptographic process can suffer from undesirably poor reconstructed image quality or the data size may have to be decreased in order to try to enhance the relatively poor reconstructed image quality, the decryption process can be undesirably complicated due to the encryption being conducted in both the spatial and spectral domains, the cryptographic process can have undesirably complicated hardware and/or optical setups for the decoder, and/or the cryptographic process still can be vulnerable to attacks, such as correlation attacks and attacks based on the family of plain text attacks.

The above-described description is merely intended to provide a contextual overview relating to digital holograms and cryptography, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to encrypting and decrypting content using a holographic cryptographic process(es). Disclosed herein is a system comprising at least one memory that stores computer-executable components, and at least one processor, coupled to the at least one memory, that executes or facilitates execution of the computer-executable components, comprising. The computer-executable components comprise an image generator component that generates a first image that comprises a scaled source image and random content, wherein a source image is modified to generate the scaled source image. The computer-executable components also comprise a holographic cryptographic component that generates a phase hologram that represents the first image and encrypts the phase hologram using a random phase mask as a private encryption key to facilitate cryptographically securing the scaled source image.

Also disclosed herein is a system comprising at least one memory that stores computer-executable components, at least one processor, coupled to the at least one memory, that executes or facilitates execution of the computer-executable components. The computer-executable components comprise a holographic cryptographic component that receives an encrypted hologram associated with a source image and decrypts the encrypted hologram to generate a decrypted hologram based at least in part on a conjugate phase mask, wherein the encrypted hologram is based at least in part on a phase hologram that represents a first image that comprises a scaled source image and a set of random content, the source image is adjusted in size to generate the scaled source image, and the conjugate phase mask inversely corresponds to a random phase mask used to encrypt the phase hologram to generate the encrypted hologram. The computer-executable components also comprise a display component that presents a reconstructed source image that is generated in response to illumination of at least a portion of the decrypted hologram using a coherent light beam.

Also disclosed herein is a method that comprises generating, by a system comprising a processor, a phase hologram that represents a randomized global image, wherein the randomized global image comprises a modified source image and a set of random content. The method also comprises encrypting, by the system, the phase hologram based at least in part on a random phase mask to facilitate cryptographically securing the modified source image.

Further disclosed herein is a non-transitory computer-readable medium storing computer-executable instructions that, in response to execution, cause a system comprising a processor to perform operations. The operations comprise generating a global image that comprises a modified source image and a set of random content, wherein a source image is modified in size in at least one dimension to generate the modified source image, the modified source image is randomly located in a first location within the global image, and the set of random content is located in one or more other locations within the global image that do not overlap the first location. The operations also comprise generating a phase-only hologram that represents the global image. The operations further comprise encrypting the phase-only hologram, based at least in part on a random phase mask, to facilitate cryptographically securing the modified source image.

The disclosed subject matter also includes a system comprising means for generating a first image that comprises a modified source image and a set of random content, wherein a source image is adjusted in size to generate the modified source image, the modified source image is randomly located in a first location within the first image, and the set of random content is located in one or more other locations within the first image that do not overlap the first location. The system also comprises means for generating a phase hologram that represents the first image. The system further comprises means for encrypting the phase hologram, based at least in part on a random phase mask, to facilitate cryptographically securing the modified source image.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
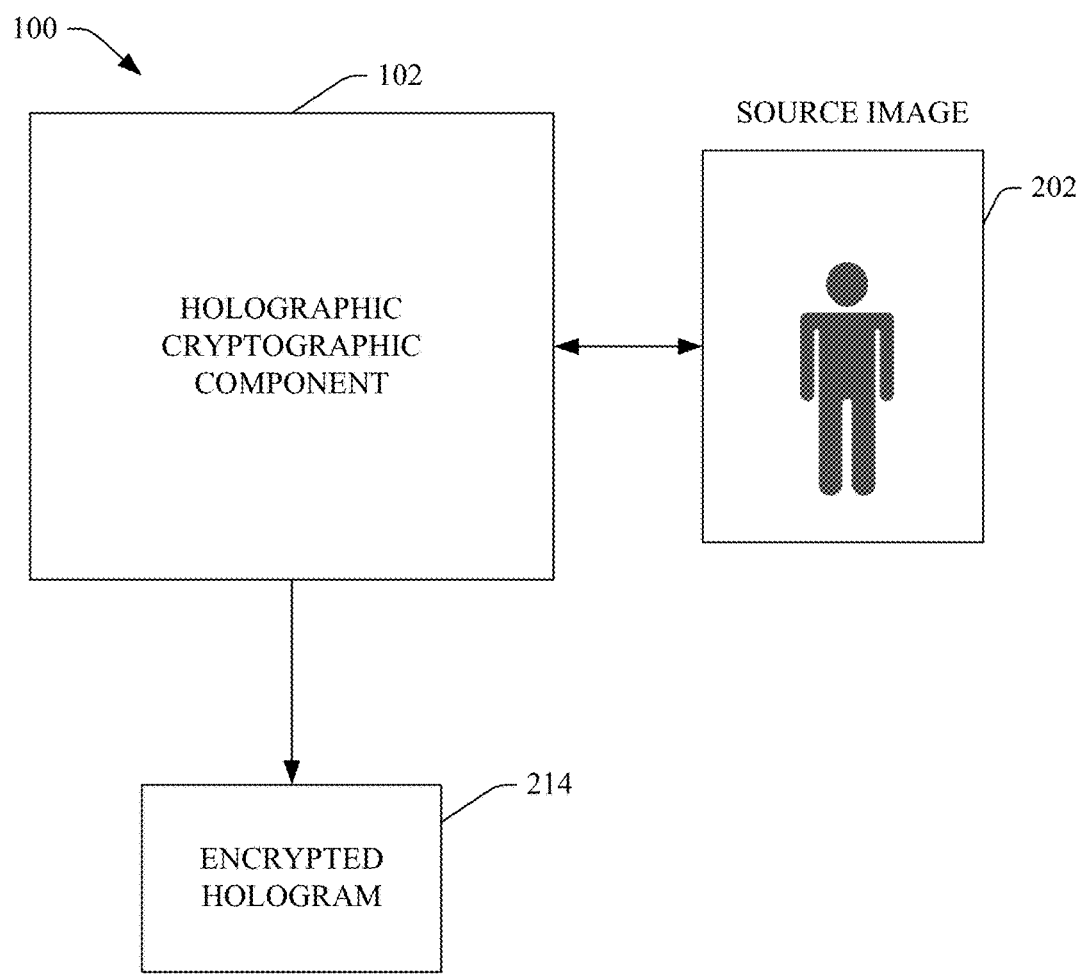
FIG. 1 illustrates a block diagram of an example system that can facilitate performing desirable encryption of content using a holographic cryptographic process, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

It can be desirable to protect image data using cryptographic techniques (e.g., image encryption and decryption), for example, to prevent unauthorized access to video and image data, enforce and manage digital rights (e.g., digital rights management), and copyright protection. A conventional encryption system can comprise an encoder that can receive source data X as input and can convert the source data X into a different form Y (e.g., encrypted data Y) based on a secret key K. As the encrypted data Y is composed by the source data X and the secret key K, it generally will not reveal the source data X.

A conventional decryption system can comprise a decoder that, using the correct secret key (e.g., secret key K), can recover the source data, or at least a usable version of the source data, from the encrypted data Y. For instance, the decoder can receive the encrypted data Y, and can apply the secret key K to the encrypted data Y to convert the encrypted data Y into recovered data X' that can correspond to (e.g., be the same or at least substantially the same as) the original source data X. The decryption process may or may not be lossless, depending on the encryption and decryption processes employed, and recovered data X' can be different from the original source data X, although it can still be acceptable, within a certain tolerance, for many types of applications.

While much research has been performed to try to develop a secure encryption system, counter research on cracking encryption systems (e.g., deriving the secret key from the source and encrypted data) is also quite vibrant. People working in the area of data encryption and decryption are commonly referred to as cryptanalysts. Attacks on the encoder are usually based on correlation, plain text, known plain text, or chosen plain text methods. However, an encoder can be quite difficult to attack or crack if it has the following attack resistant properties: 1) the source data X, secret key K, and encrypted data Y are very weakly correlated; 2) the encrypted data Y and the secret key K cannot be predicted in its current form, or in the spectral domain, for all input of source data X; 3) the encrypted data Y and the secret key K cannot be predicted in its current form, or in the spectral domain, for all output Y; 4) a slight deviation in the input of source data X will lead to significant changes in the encrypted data Y in its current form, or in the spectral domain; and 5) for the same input of source data X, the encrypted data Y is different in each run of the encryption process.

In general, encryption techniques generate the same result for the same input and encryption key, which can be a secret key. As such, the secret key can be deduced through attacks (e.g., a correlation attack, an attack from a family of plain text attacks (e.g., plain text attack, known plain text attack, or chosen plain text attack), or other type of attack) by an attacker if the source and the encrypted data are known by the attacker.

Conventional encryption methods, like the Rivest, Shamir, and Adleman (RSA) encryption method, can be computationally intensive and typically are suitable for handling a relatively small amount of data. However, image data, particularly video and/or holographic image data, can comprise a large amount of data, which can make the use of conventional encryption methods, like the RSA encryption method, less desirable.

There also has been some development done in the area of holographic encryption. Some conventional holographic encryption techniques developed have been based on a double random phase encoding (DRPE) framework. In this approach, the source image=I(x,y) can be first overlaid with a random phase mask $K_1(x,y)$ (the $1^{st}$ encryption key) to change the phase angle of each of its pixels to a random value, resulting in a complex image $I_R(x,y)$. Next, $I_R(x,y)$ can be Fourier transformed to its frequency spectrum, $\hat{I}_R(\omega_x, \omega_y)$. Note that $\hat{I}_R(\omega_x,\omega_y)$ can be interpreted as a complex image with the value of each pixel representing a frequency component of $\hat{I}_R(\omega_x,\omega_y)$. A random phase mask K2, which can be taken as the second encryption key $K_2(\omega_x, \omega_y)$, can be added to $\hat{I}_R(\omega_x,\omega_y)$ to give a new image $\hat{I}_{R2}(\omega_x,\omega_y)$. The encrypted ciphertext hologram, H(u,v), can be obtained by applying Fourier transform on $\hat{I}_{R2}(\omega_x,\omega_y)$. Based on the same principle, the DRPE method also can be realized with a Fractional Fourier transform or a Fresnel transform, instead of a Fourier transform. Recently, techniques that can employ a quick response (QR)-code for a somewhat more noise-free reconstruction of the encrypted images have also been reported.

However, the conventional DRPE methods can be inherently susceptible to plaintext attack, if, for example, the cryptanalyst can access the encoder and generate the ciphertext hologram of selected source images. As is known with such conventional DRPE methods, the random phase mask on the transform plane can be deduced from the inverse Fourier transform of the ciphertext hologram corresponding to the source image of a Dirac impulse (e.g., a single dot). Attempts to decrease the vulnerability of the DRPE framework have been made by scrambling the pixels of the source image or spatial multiplexing of multiple images. However, the incorporation of spatial rearrangement can only increase the difficulty in obtaining the encryption key, rather than prevent it. There have been other measures employed to attempt to prevent the Plaintext attack on the DRPE method by preserving only the phase information on the encrypted hologram. One deficiency of such measures is that the reconstructed image may not be visible or may have poor quality.

One particular conventional cryptographic technique employs a holographic double random phase (HDRP) algorithm to perform encryption. This HDRP algorithm has been shown to be somewhat effective in encrypting optical images, text, and numerical data. However, images (e.g., reconstructed images) that have been reconstructed based on the HDRP algorithm can be undesirably noisy and can suffer from a number of other disadvantages or undesirable qualities.

One disadvantage of the HDRP cryptographic process is that it can have an undesirably complicated decryption process due to the encryption being conducted in both the spatial and spectral domains. Another disadvantage of the HDRP cryptographic process is that it can have undesirably complicated hardware and/or optical setups for the decoder. Still another disadvantage of the HDRP cryptographic process is that it can be vulnerable to attacks, such as correlation attacks and attacks based on the family of plain text attacks. Yet another disadvantage of the HDRP cryptographic process is that it can suffer from undesirably poor reconstructed image quality or the data size may have to be decreased in order to try to enhance the relatively poor reconstructed image quality.

To that end, presented are techniques for encrypting multi-dimensional images, and decrypting and reconstructing multi-dimensional images, to facilitate security in image and holographic communications, preventing unauthorized access to images (e.g., video and image data), digital rights management of images, and copyright protection of images. A holographic cryptographic component can encrypt a multi-dimensional image to produce a phase only hologram. To facilitate the encryption, the holographic cryptographic component can add random noise to a source multi-dimensional visual image and convert the result (e.g., the source image with the added random noise) into a hologram by employing a stochastic hologram generation process. The holographic cryptographic component can add a fixed random phase mask (e.g., a fixed, randomly generated phase mask), which can be the encryption key, to the hologram to generate an encrypted hologram that can represent or correspond to the original source multi-dimensional visual image. The encrypted hologram can be stored in memory or communicated via a desired communication link (e.g., a wireline or wireless communication link), as desired. By employing the stochastic hologram generation process, even for the same object (e.g., image or object within an image), the holographic cryptographic component can generate different holograms (e.g., encrypted holograms) in repetitive runs of the encryption process, which can facilitate securing the data (e.g., image data) and resisting attacks on the data (e.g., resisting correlation attacks, attacks based on the family of plain text attacks, or other types of attacks on the data).

To reconstruct the original source multi-dimensional visual image, a holographic cryptographic component (e.g., another holographic cryptographic component at the decoding end) can receive (e.g., obtain, retrieve, etc.) the encrypted hologram, for example, from memory or via the communication link. At the decoding end, the holographic cryptographic component can overlay a phase mask, which can correspond to the encryption key, on the encrypted hologram, wherein the encrypted hologram, with the phase mask overlaid thereon, can be illuminated using a coherent light source to facilitate generating and displaying a reconstructed and decrypted multi-dimensional visual image (e.g., holographic image) that can represent or correspond to (e.g., at least can be substantially the same as) the original source multi-dimensional visual image. The original source image is only reconstructed properly if the correct phase mask is used. In some implementations, the decryption process employed by the holographic cryptographic component at the decoding end can be performed or realized numerically by the holographic cryptographic component, for example using a computer, a graphic processing unit (GPU), and/or a field-programmable gate array (FPGA).

Another feature of the disclosed subject matter is that, if the holographic cryptographic component at the encoding end applies the holographic encryption process repetitively to the same source image, the holographic cryptographic component can generate a different encrypted hologram for each run. This can facilitate better securing the encrypted content from attack via correlation attacks or attacks based on the family of plain text attacks.

Turning to FIG. 1, illustrated is a block diagram of an example system 100 that can facilitate performing desirable encryption of content (e.g., multi-dimensional visual images) using a holographic cryptographic process, in accordance with various aspects and embodiments of the disclosed subject matter. The system 100 can perform such holographic cryptographic process, for example, to facilitate security of communication of content (e.g., image and holographic communications), preventing unauthorized access to content (e.g., video and image data), digital rights management of content, and copyright protection of content.

The system 100 can comprise a holographic cryptographic component 102 that can employ a holographic cryptographic process, comprising a holographic encryption process (e.g., a single random phase encryption (SRPE) process), to encrypt content, such as, for example, visual images (e.g., multi-dimensional images), although other types of content can be encrypted. In some implementations, the holographic encryption process can be or can comprise a single random phase encryption (SRPE) process, which can be a multi-stage (e.g., 3 stage) encryption process. Using the holographic encryption process, the holographic cryptographic component 102 can encrypt a multi-dimensional visual image to produce (e.g., generate) a ciphertext hologram, which can be based at least in part on a phase hologram (e.g., a phase-only hologram (POH), phase-specific hologram, or pure phase hologram) and a random phase mask that can be associated with the phase hologram. A phase hologram generated via the holographic encryption process also can be referred to as a single random phase (SRP) hologram. The holographic cryptographic component 102, by employing the SRPE process, can desirably perform the encryption of content using only a single random phase mask as the encryption key (e.g., the SRPE process only requires a single random phase mask as a private encryption key). The SRPE process can be relatively low in complexity, and it and the encrypted content derived from the SRPE process can be highly resistant to attacks (e.g., correlation attacks, plain text attacks, or other types of attacks).

Figure 2:
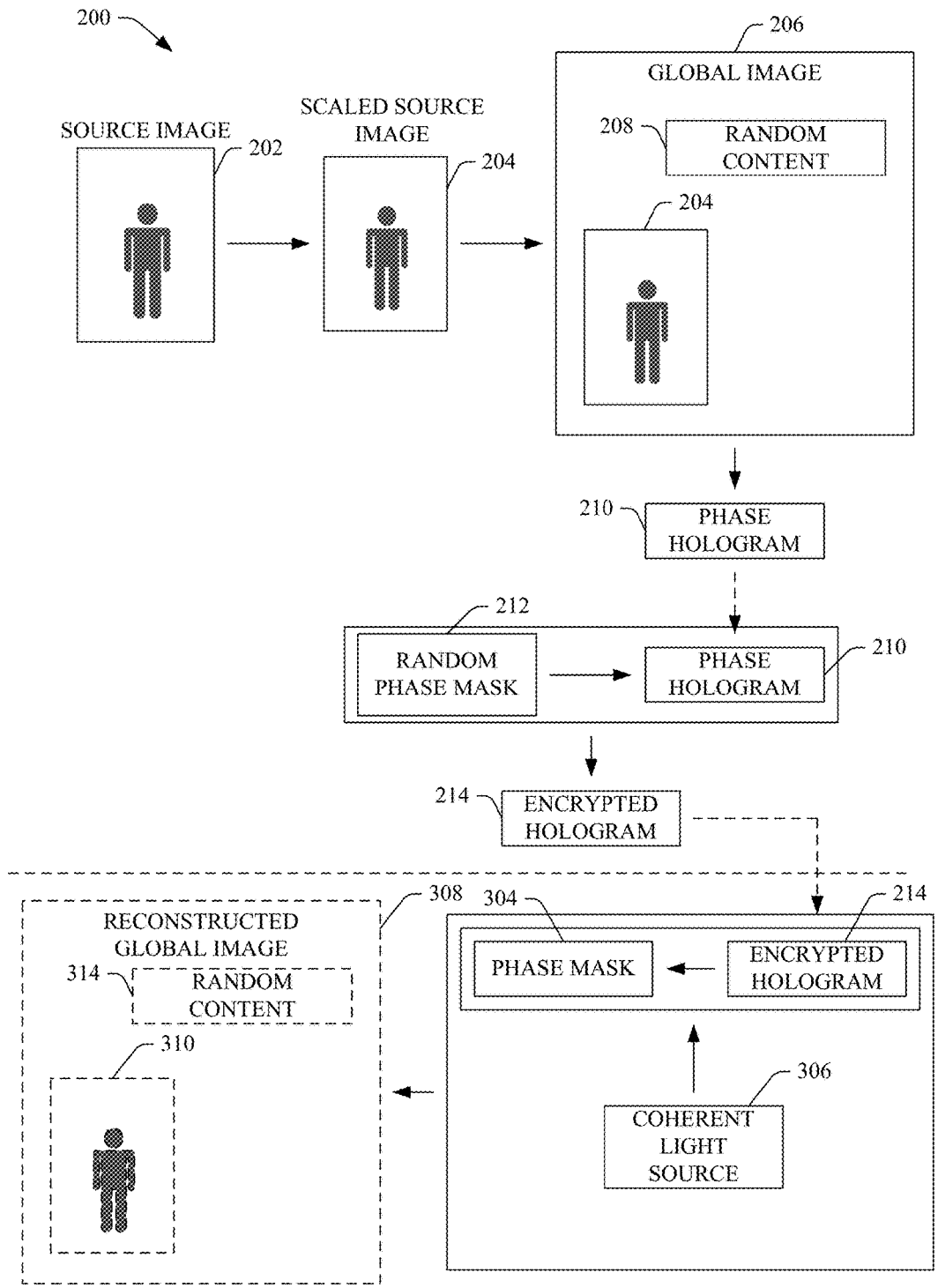
FIG. 2 depicts a block diagram of an example encryption flow using a single random phase encryption (SRPE) process, in accordance with various aspects and embodiments of the disclosed subject matter.

Referring briefly to FIG. 2 (along with FIG. 1), FIG. 2 depicts a block diagram of an example encryption flow 200 using the SRPE process, in accordance with various aspects and embodiments of the disclosed subject matter. In the first stage of the SRPE process, to facilitate the encryption of a source image 202, the holographic cryptographic component 102 can add random noise to the source image 202. In some implementations, the holographic cryptographic component 102 can scale the source image 202 (e.g., source multi-dimensional visual image) in size by a defined scaling amount (e.g., downscaled in size by a small or mild amount, or upscaled in size by a small or mild amount) using a defined scaling factor(s) (e.g., a random scaling factor(s)) along each dimension (e.g., length, width, and/or depth) to generate a scaled source image 204. The holographic cryptographic component 102 can paste the scaled source image 204 to an arbitrary or a random position in a larger global image 206 (e.g., a global image that is larger in size than the scaled source image). The holographic cryptographic component 102 also can generate random content 208 (e.g., random alphanumeric characters, shapes, or images) and can fill all or a portion of the remaining areas of the global image 206, which are not occupied by the scaled source image 204, with the random content. As such, the global image 206, as a whole, can be significantly different from the original source image 202 in the spatial or spectral domain, while at the same time, the source image 202 can be preserved with desirably good fidelity. In addition, as the holographic cryptographic component 102 can impose randomness on the generation of the global image 206, by, for example, randomly scaling the source image 202, randomly pasting the scaled source image 204 into a random or arbitrary position in the global image 206, and/or filling the remaining area of the global image 206 with random content 208, the holographic cryptographic component 102 can generate a substantially or vastly different global image 206 in each run of the SRPE process with respect to the original source image 202.

This first stage of the SRPE process can ensure that an attacker (e.g., cryptanalyst) will have no knowledge as to what image 202 is being encrypted, and hence, the attacker will not be able to deduce any relationship between the encrypted hologram (e.g., ciphertext hologram) generated using the SRPE process and the source image 202. This first stage of the SRPE process also can increase the difficulty in deducing the encryption key through, for example, large-scale chosen plain text attacks (e.g., through prompting the encoder with a large number of different source images, each with a small amount of incremental change from the other images, to try to locate the affected regions of the ciphertext hologram and the random phase mask).

In the second stage of the SRPE process, the holographic cryptographic component 102 can convert the result, e.g., the global image 206 comprising the scaled source image 204 and the random content 208, into a hologram, such as a phase hologram 210 (e.g., a phase-only hologram (POH), phase-specific hologram, or pure phase hologram). In some implementations, the holographic cryptographic component 102 can convert the global image 206, comprising the scaled source image 204 and the random content 208, into a phase hologram 210 by employing a stochastic hologram generation process.

In certain implementations, the holographic cryptographic component 102 initially can generate a complex hologram that can represent the global image 206 comprising the scaled source image 204 and the random content 208, and can convert the complex hologram to a phase hologram 210, using a desired phase hologram generation technique. For example, to generate a phase hologram 210 of the global image 206, the holographic cryptographic component 102 can use a phase hologram generation technique comprising a bi-direction error diffusion (BERD) algorithm, a localized error diffusion and redistribution (LERDR) algorithm, a unidirectional error diffusion (UERD) algorithm, or other desired phase hologram generation algorithm. A complex hologram (e.g., a complex amplitude hologram) is a hologram that can comprise a magnitude component or portion (e.g., an amplitude magnitude component or portion), which can have a magnitude value, and a phase component or portion, which can have a phase value. The holographic cryptographic component 102 can use the desired phase hologram generation technique to modify or remove the magnitude component or portion of the complex hologram (e.g., for each pixel, set or modify the magnitude value to a defined constant magnitude value) to facilitate generating a phase hologram (e.g., POH, phase-specific hologram, or pure phase hologram) that can have the phase component or portion, but does not have the magnitude component or portion.

In the third stage of the SRPE process, the holographic cryptographic component 102 can generate a random phase mask 212 (e.g., a fixed, randomly generated phase mask), which can be the encryption key, and can apply, add, integrate, multiply, or otherwise associate the random phase mask 212 to, with, or by the phase hologram 210 (e.g., to modify the phase hologram 210) to generate an encrypted hologram 214 (e.g., the ciphertext hologram) that can represent or correspond to the original source image 202 (e.g., can comprise the original source image 202 in encrypted form). The resulting encrypted hologram 214 can be a white-noise ciphertext hologram that can be uncorrelated to the global image 206 and the original source image 202.

The holographic cryptographic component 102 can store the encrypted hologram 214 in memory and/or can communicate the encrypted hologram 214 via a desired communication link (e.g., a wireline or wireless communication link), as desired. By employing the SRPE process, comprising the stochastic hologram generation process, even for the same object (e.g., image or object within an image), the holographic cryptographic component 102 can generate different holograms (e.g., different encrypted holograms) in repetitive runs of the encryption process, which can facilitate securing the data (e.g., image data) and resisting attacks on the data (e.g., resisting correlation attacks, attacks based on the family of plain text attacks, or other types of attacks on the data).

Figure 3:
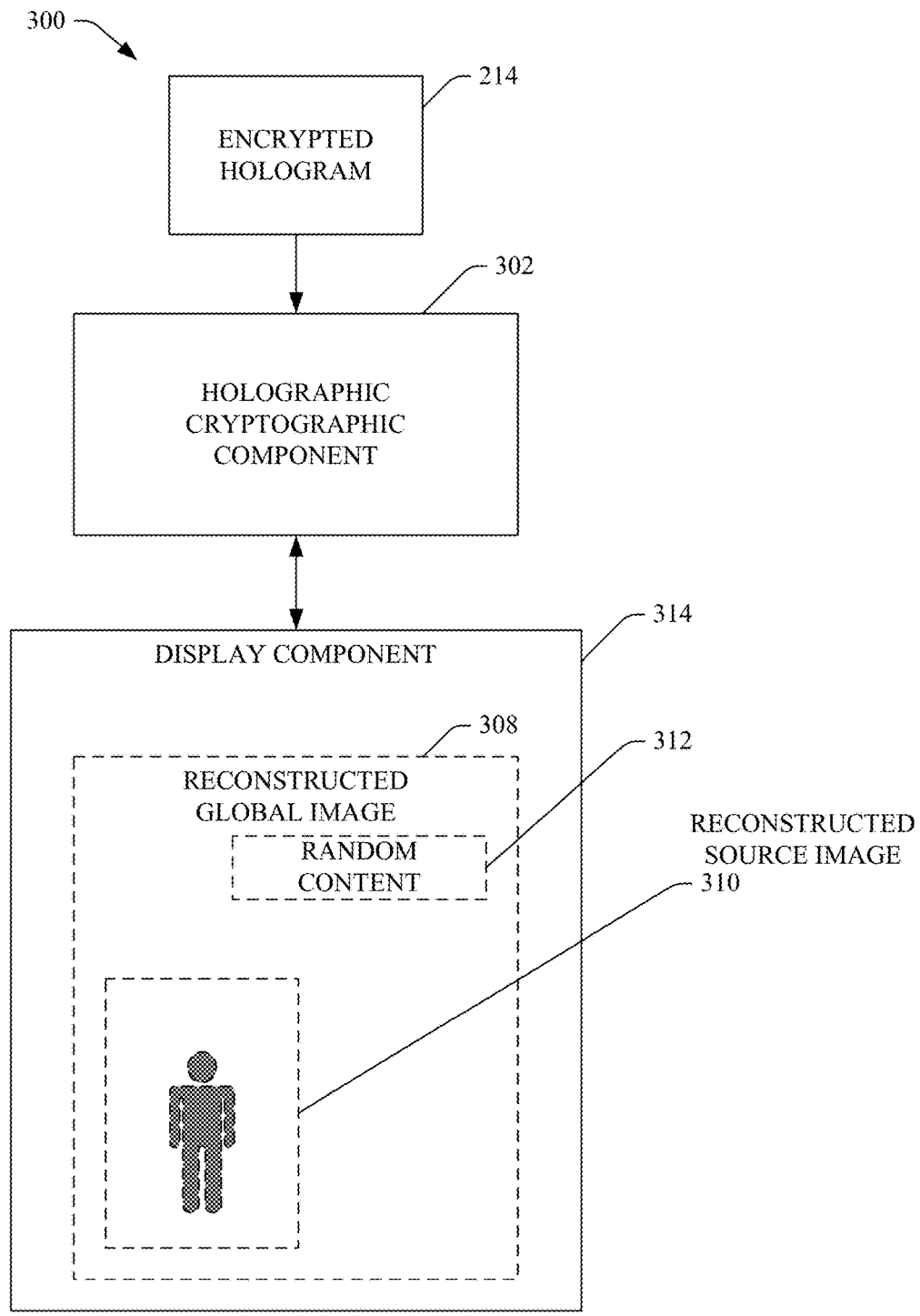
FIG. 3 illustrates a block diagram of an example system that can decode or decrypt an encrypted hologram, in accordance with various aspects and implementations of the disclosed subject matter.

Referring to FIG. 3 (along with FIG. 1 and FIG. 2), FIG. 3 illustrates a block diagram of an example system 300 that can decode or decrypt an encrypted hologram, in accordance with various aspects and implementations of the disclosed subject matter. The system 300 can comprise a holographic cryptographic component 302 (e.g., a holographic cryptographic component at the decoding end) that can facilitate decoding or decrypting encoded or encrypted data, such as encrypted holograms.

To reconstruct the original source multi-dimensional visual image, the holographic cryptographic component 302 can receive (e.g., obtain, retrieve, etc.) the encrypted hologram 214, for example, from memory or via the communication link (e.g., from the holographic cryptographic component 102). At the decoding end, the holographic cryptographic component 302 can generate or receive a phase mask 304, which can inversely correspond to and/or be the conjugate of the encryption key (e.g., the random phase mask 212) associated with the encrypted hologram 214. The holographic cryptographic component 302 can associate the phase mask with, overlay the phase mask 304 on, and/or integrate the phase mask 304 with, the encrypted hologram 214, wherein the encrypted hologram 214, with the phase mask 304 overlaid thereon, can be illuminated using a coherent light source 306 to facilitate generating and reconstructing a decrypted and reconstructed global image 308, comprising a reconstructed visual image 310 and reconstructed random content 312, all or a portion (e.g., the reconstructed visual image 310) of which can be displayed on a display component 314.

The reconstructed global image 308 can be the same or substantially the same as the global image 206, as the reconstructed global image 308 can have relatively good visual quality and fidelity relative to the original global image 206 (e.g., the global image 206 is preserved with good fidelity when reconstructed to generate the reconstructed global image 308). From the reconstructed global image 308, the reconstructed visual image 310, which can be occupying an area of the reconstructed global image 308 that can correspond with the area of the global image 206 wherein the scaled source image 204 was pasted, can be observed with favorable visual quality. The reconstructed visual image 310 (e.g., multi-dimensional visual and/or holographic image) can be the same or substantially the same as the source image 202, as the reconstructed visual image 310 can represent or correspond to (e.g., at least can be substantially the same as) the original source image 202, and can have relatively good visual quality and fidelity relative to the source image 202 (e.g., the source image 202 is preserved with good fidelity when reconstructed to generate the reconstructed visual image 310). In some implementations, the reconstructed visual image 310 can be a full-parallax 3-D Fresnel holographic image. The reconstructed random content 312 can be the same or substantially the same as the random content 208, as the reconstructed random content 312 can have relatively good visual quality and fidelity relative to the random content 208 (e.g., the random content 208 is preserved with good fidelity when reconstructed to generate the reconstructed random content 312).

The original source image 202 is only reconstructed properly if the correct phase mask 304 is used (e.g., if the phase mask, which can inversely correspond to and/or be the conjugate of the random phase mask used to encrypt the hologram at the encryption end of the process, is used). In some implementations, the decryption process (e.g., corresponding to the SRPE process) employed by the holographic cryptographic component 302 at the decoding end can be performed or realized numerically by the holographic cryptographic component 302, for example using a computer, GPU, and/or FPGA.

Another feature of the disclosed subject matter is that, if the holographic cryptographic component 102 at the encoding end applies the holographic encryption process (e.g., SRPE process) repetitively to the same source image, the holographic cryptographic component 102 can generate a different encrypted hologram for each run. This can facilitate better securing the encrypted content from attack via correlation attacks or attacks based on the family of plain text attacks.

In some embodiments, the holographic cryptographic component 102, the holographic cryptographic component 302, the display component 310, and/or other components of the system 100 or system 300 can be part of a multiple-view aerial holographic projection system (MVAHPS) that can generate and display a 3-D holographic image(s) of a 3-D real or synthetic, static or animated, object scene (e.g., associated with one or more source images) viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 310. The holographic cryptographic component 102, the holographic cryptographic component 302, and display component 310 (e.g., a spatial light modulator (SLM) or a liquid crystal on silicon (LCoS) display device, which can be a phase-only or phase-specific display device) can facilitate generating and displaying holograms (e.g., phase holograms) at video rate in real time or near real time (e.g., facilitate generating a complex hologram, converting the complex hologram to a phase hologram, and displaying, for example, 2048×2048-pixel holographic images (or larger-sized hologram), each of which can represent 4 million object points (or more), at approximately 40 frames per second or faster, in real time or near real time).

The systems, devices, methods, processes, techniques, etc., of the disclosed subject matter can have a number of other advantages and features over conventional systems, methods, devices, methods, processes, and techniques. For instance, one advantage can be that the disclosed subject matter can comprise encryption and decryption processes that can be less complicated than conventional encryption and decryption processes. Another advantage can be that the disclosed subject matter can comprise a decoder component, comprising a holographic cryptographic component (e.g., 302), that can be realized with less complex optical setups than conventional decoders, and can be more computationally efficient, if realized numerically, than conventional decoders. Still another advantage can be that the disclosed subject matter can comprise the desirable attack resistant properties disclosed herein and, thus, can be more highly resistant to various different kinds of attacks on the encrypted images (e.g., encrypted video or holographic images), including correlation attacks and attacks based on the family of plain text attacks, as compared to conventional encryption processes, such as the HDRP cryptographic process or other types of DRPE cryptographic processes. Yet another advantage can be that the disclosed subject matter can generate images (e.g., reconstructed images) that can have more favorable reconstructed image quality than the reconstructed images obtained using conventional processes, such as the HDRP cryptographic process or other types of DRPE cryptographic processes. Still another advantage can be that the disclosed subject matter can be employed to encrypt and decrypt relatively large 2-D and 3-D images more efficiently than conventional cryptographic processes.

These and other aspects of the SRPE process are further disclosed herein, with further regard to FIGS. 1, 2, and 3. The first stage of the multi-stage SRPE process can comprise converting the source image into, or introducing the source image into, a global image. For ease of explanation, it can be assumed that the source image is a 2-D planar image I(x,y) that can be parallel to the hologram, where x is the horizontal, and y is the vertical discrete co-ordinate axes. The steps or operations that follow can be extended and applied to an arbitrary 3-D image as well though. The holographic cryptographic component 102 can generate a larger image G(x,y) (also referred to as the global image 206), with a size that can be larger than the source image 202 and this can be taken as the input of the encoder component comprising holographic cryptographic component 102. To start with, holographic cryptographic component 102 can modify or re-size the length and width of the source image with scaling factors $s_x$, and $s_y$, respectively, to generate a scaled source image 204. The holographic cryptographic component 102 can translate or paste the scaled source image 204 to a random position on G(x,y). The holographic cryptographic component 102 can fill all or a portion of the area that is not occupied by the scaled source image 204 with random content 208 (e.g., randomly selected contents, such as text characters, shapes, other images). It is desirable for the holographic cryptographic component 102 to compose the larger global image G(x,y) inside the encoder component, so that the operator of the encoder component or others will have absolutely no knowledge on what is actually being encrypted by holographic cryptographic component 102.

Mathematically, G(x,y) can be given by Equation (1) as follows:

$$G(x,y)=I(s_x x+T_x, s_y y+T_y) \cup P, \quad (1)$$

wherein $T_x$ and $T_y$ are the translation along the x and the y directions, and P represents the added random content 208. The added random content 208 can be 2-D content, 3-D content, or a mixture of 2-D and 3-D content.

Figure 4:
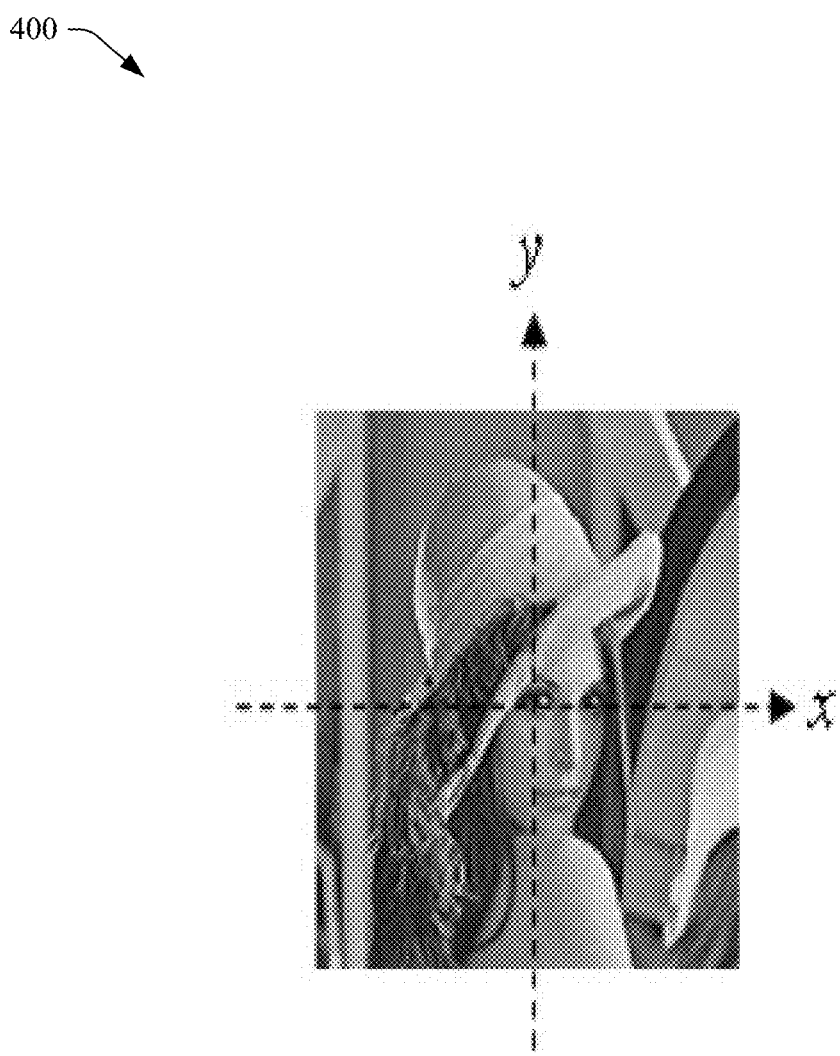
FIG. 4 depicts an example source image that can be processed using the SRPE process, in accordance with aspects and implementations of the disclosed subject matter.
Figure 5:
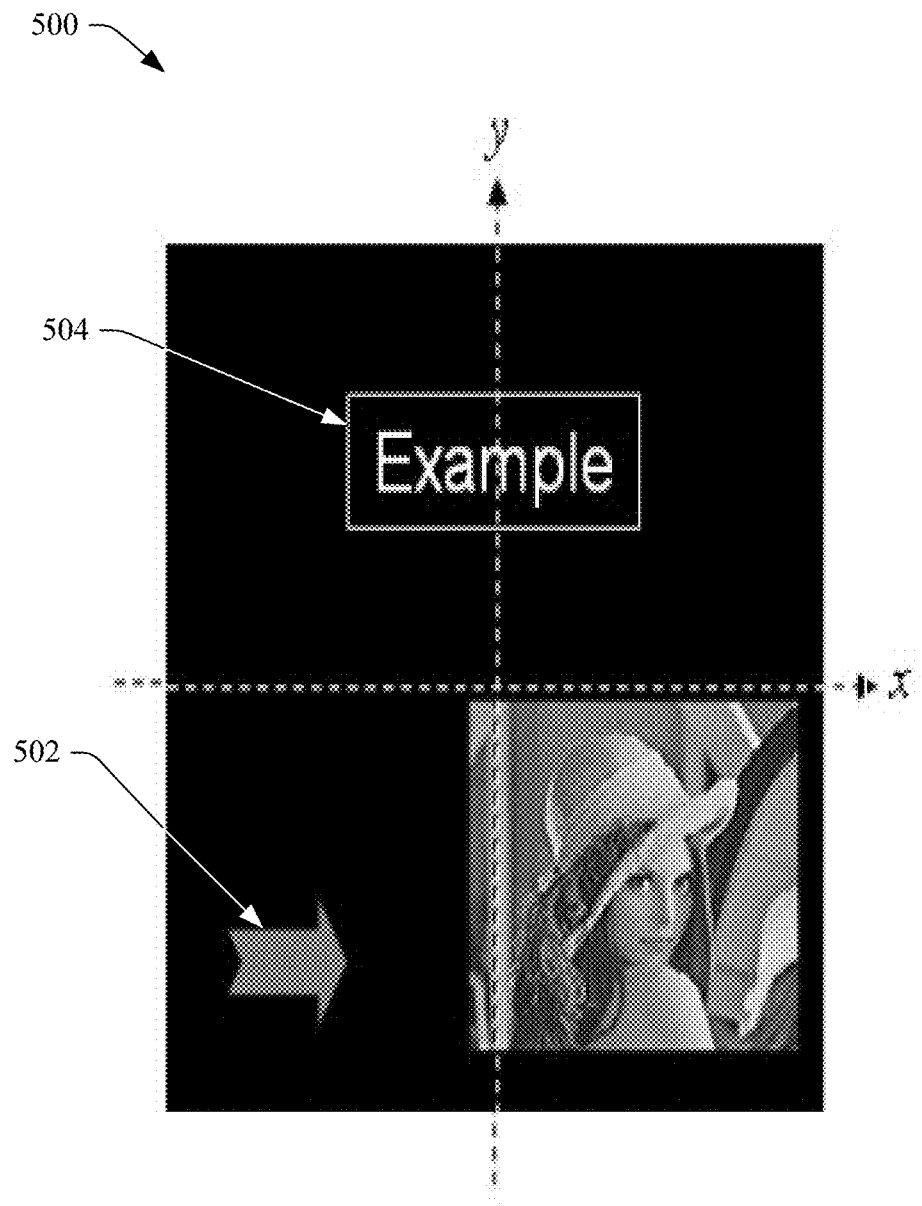
FIG. 5 depicts an example global image that can be processed using the SRPE process, in accordance with various aspects and implementations of the disclosed subject matter.

Referring briefly to FIG. 4 and FIG. 5 (along with FIGS. 1, 2, and 3), FIG. 4 depicts an example source image 400, and FIG. 5 depicts an example global image 500, that respectively can be processed using the SRPE process, in accordance with various aspects and implementations of the disclosed subject matter. The holographic cryptographic component 102 can convert the source image 400, I(x,y), to the larger global image 500, G(x,y), or can generate the larger global image 500, comprising the source image 400. For instance, the holographic cryptographic component 102 can scale the length and width of the source image 400 by a defined scaling factor(s) to adjust the size (e.g., to make a relatively small adjustment in size) of the source image 400 to generate a scaled source image. In generating the scaled source image, the holographic cryptographic component 102 also can perform translation on the source image and insert (e.g., randomly select and insert) additional 2-D content during the source image conversion process. For example, the holographic cryptographic component 102 can generate the global image 500 to comprise the scaled source image that is positioned or pasted in a random location within the global image 500, and random content, comprising an arrow 502 and a random text string 504, that can be positioned or pasted in respective random locations within the global image 500 that are in areas of the global image 500 that are not occupied by the scaled source image. These types of modest geometric changes (e.g., scaling, translating) on images typically are not regarded as distortion, as they are commonly imposed by the display monitors and the viewing position of the observer. The inserted random contents can enrich the scene with extra information in the global image 500, but they do not contaminate the scaled source image. However, incorporating the above changes to the source image 400 can result in a global image 500 that can be significantly different from the source image 400 in both the spatial and the spectral domains.

During the second stage of the SRPE process, the holographic cryptographic component 102 can generate a phase hologram (e.g., POH, phase-specific hologram, or pure phase hologram) that can represent the global image 500 in holographic form, based at least in part on the global image 500, using a desired phase hologram generation process (e.g., BERD process, LERDR process, UERD process, or other desired process). The holographic cryptographic component 102 can convert the global image 500 into a complex Fresnel hologram H(u,v), for example, by determining (e.g., calculating) the complex Fresnel hologram using Equation (2) as follows, $$H(u, v) = \sum_{x=0}^{X-1}\sum_{y=0}^{Y-1} G(x, y)\exp\left[\frac{i2\pi}{\lambda}r_{x,y;u,v}\right], \quad (2)$$

wherein λ is the wavelength of the optical beam, $r_{x,y;u,v}$ is the distance from a point at (x,y) on the global image, to a point (u,v) on the hologram, and X and Y can be the number of rows and columns of the hologram, respectively, which can be assumed to be the same as (e.g., can correspond to) the global image 500 (e.g., global image 500 can be assumed to have X rows and Y columns) With a supposition that the axial distance between the global image and the hologram is denoted by z, and δ is the sampling interval, which can be assumed to be identical along the horizontal and the vertical directions, $r_{x,y;u,v}$ can be determined (e.g., by the holographic cryptographic component 102) in accordance with (e.g., using) Equation (3) as follows, $$r_{x,y;u,v} = \sqrt{(x-u)^2\delta^2 + (y-v)^2\delta^2 + z^2}. \quad (3)$$

The holographic cryptographic component 102 can convert the complex hologram, H(u,v), into a phase hologram (e.g., POH), $H_p(u,v)$, using a desired phase hologram generation process (e.g., BERD process, LERDR process, UERD process, or other desired process). For exemplary purposes, the conversion of the complex hologram to a phase hologram will be further described using the BERD process. The holographic cryptographic component 102 also can use, for example, the LERDR process, as described in application Ser. No. 14/305,494, filed on Jun. 16, 2014, and entitled "CONVERSION OF COMPLEX HOLOGRAMS TO PHASE HOLOGRAMS," the entirety of which is incorporated herein by reference, or the UERD process, as described in application Ser. No. 14/029,144, filed on Sep. 17, 2013, and entitled "CONVERTING COMPLEX HOLOGRAMS TO PHASE HOLOGRAMS," the entirety of which is incorporated herein by reference.

In accordance with the BERD process, the holographic cryptographic component 102 can process the complex hologram associated with the global image 500 from the top to the bottom row. In the odd rows, the holographic cryptographic component 102 can scan the pixels of the hologram in a left-to-right direction, and in the even rows, the holographic cryptographic component 102 can scan the pixels of the hologram in a right-to-left direction. The holographic cryptographic component 102 can set the magnitude of each visited pixel (e.g., scanned pixel) to a defined value, such as unity (which can be transparent), while maintaining the phase value of the phase component of the hologram intact, for example, in accordance with Equation (4), $$|H_p(u_j,v_j)|=1, \text{ and } \arg(H_p(u_j,v_j))=\arg(H(u_j,v_j)), \quad (4)$$

wherein $(u_j,v_j)$ are the co-ordinates of the currently visited pixel. The modification, removing, or dropping of the magnitude of the hologram pixel can result in an error $E(u_j,v_j)$, that can be determined using, for example, Equation (5), $$E(u_j,v_j)=H(u_j,v_j)-H_p(u_j,v_j). \quad (5)$$

If this error is not accounted for, such error can negatively impact the quality of the phase hologram. In accordance with the BERD process, for visited pixels, the holographic cryptographic component 102 can reduce or minimize the effect of the error associated with a visited pixel, by diffusing the error to a subset of neighborhood pixels (e.g., neighbor pixels) associated with (e.g., in proximity to) the visited pixel. To facilitate diffusing the error to the neighborhood pixels in proximity to a current visited pixel, the hologram cryptographic component 102 can facilitate updating the neighborhood members in proximity to the current visited pixel, based at least in part on the error of the current visited pixel and respective weighting values (e.g., respective constant coefficients) for respective neighborhood members that can be based at least in part on their proximity to the current visited pixel.

For example, for the pixels being visited in the even rows, the hologram cryptographic component 102 can apply or perform the error diffusion process in a first direction (e.g., a left-to-right direction) and can facilitate diffusing or compensating for the errors associated with the pixels on the odd rows of the complex hologram to the respective neighboring pixels (e.g., neighboring pixels that have not been visited or scanned yet by the hologram cryptographic component 102), in accordance with (e.g., by applying or performing calculations according to) Equations (6), (7), (8), and (9) below. For the pixels being visited in the even rows, the hologram cryptographic component 102 can apply or perform the error diffusion process in the opposite direction (e.g., a right-to-left direction) from that of the odd rows and can facilitate diffusing or compensating for the errors associated with the pixels on the even rows by, for example, in accordance with Equations (10), (11), (12), and (13) below.

$$H(u_j,v_j+1) \leftarrow H(u_j,v_j+1)+w_1 E(u_j,v_j), \quad (6)$$

$$H(u_j+1,v_j-1) \leftarrow H(u_j+1,v_j-1)+w_2 E(u_j,v_j), \quad (7)$$

$$H(u_j+1,v_j) \leftarrow H(u_j+1,v_j)+w_3 E(u_j,v_j), \quad (8)$$

$$H(u_j+1,v_j+1) \leftarrow H(u_j+1,v_j+1)+w_4 E(u_j,v_j), \quad (9)$$

$$H(u_j,v_j-1) \leftarrow H(u_j,v_j-1)+w_1 E(u_j,v_j), \quad (10)$$

$$H(u_j+1,v_j+1) \leftarrow H(u_j+1,v_j+1)+w_2 E(u_j,v_j), \quad (11)$$

$$H(u_j+1,v_j) \leftarrow H(u_j+1,v_j)+w_3 E(u_j,v_j), \quad (12)$$

$$H(u_j+1,v_j-1) \leftarrow H(u_j+1,v_j-1)+w_4 E(u_j,v_j). \quad (13)$$

wherein the operator "←" can denote updating (e.g., by the hologram cryptographic component 102) the variable on the left hand side of the operator in the expression (e.g., equation) with the variable on the right hand side of the operator in the expression. The hologram cryptographic component 102 can set the values of the constant coefficients $w_1$, $w_2$, and $w_3$, and $w_4$ to respective defined values, such as, for example, $w_1=7/16$, $w_2=3/16$, $w_3=5/16$, and $w_4=1/16$.

For instance, with regard to the scanning and processing of pixels (e.g., converting complex values of pixels to phase-only values) of the complex hologram, in accordance with the BERD process, with pixel $P_{u_j;v_j}$ being the pixel that is being processed by the hologram cryptographic component 102 and the row being $u_j$, which can be an odd row of the complex hologram, the next pixel to be scanned and processed by the hologram cryptographic component 102 can be $P_{u_j;v_j+1}$, followed by $P_{u_j;v_j+2}$, and so on, until this row $u_3$ pixels has been scanned and processed. For an even row of the complex hologram, with pixel $P_{u_j+1;v_j}$ being the pixel (e.g., that is located at the right end of the row) that is being processed by the hologram processor component 106 and the row being $u_{j+1}$, which can be an even row, the next pixel to be scanned and processed by the hologram processor component 106 in that even row can be $P_{u_j;v_j-1}$, followed by $P_{u_j;v_j-2}$, and so on, until this row $u_{j+1}$ of pixels has been scanned and processed.

Figure 6:
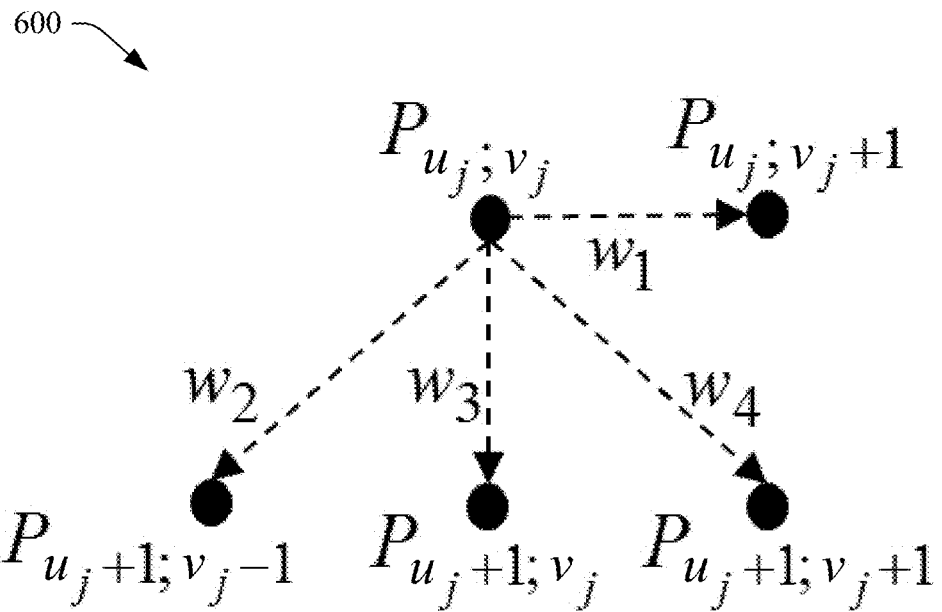
FIG. 6 presents a diagram of an example complex hologram portion that can illustrate the spatial relation between a pixel, in an odd row, and its neighbor pixels for compensation of the error via error diffusion, in accordance with various aspects and embodiments of the disclosed subject matter.

In accordance with, for example, Equations (6) through (9), FIG. 6 illustrates a diagram of an example complex hologram portion 600 that can depict the spatial relation between pixel $P_{u_j;v_j}$, in an odd row, and its neighbor pixels (e.g., neighborhood pixels) for compensation of the error via diffusion, in accordance with various aspects and embodiments of the disclosed subject matter. The complex hologram portion 600 of FIG. 6 can facilitate illustrating how the scanned pixel $P_{u_j;v_j}$ in an odd row of the complex hologram can be processed to facilitate diffusing errors to its four unvisited neighborhood pixels $P_{u_j;v_j+1}$, $P_{u_j+1;v_j-1}$, $P_{u_j+1;v_j}$, and $P_{u_j+1;v_j+1}$ via error diffusion using the BERD process. The updated value of each pixel can be visualized as the weighted sum of its four neighboring pixels.

Equivalently, Equations (6) through (9) can be rearranged into a compact recursive expression that can be given by Equation (14) as follows:

$$H(u_j,v_j) \leftarrow H(u_j,v_j) + w_1 E(u_j,v_j-1) + w_4 E(u_j-1,v_j-1) + w_3 E(u_j-1,v_j) + w_2 E(u_j-1,v_j+1) \quad (14)$$

For example, the hologram cryptographic component 102 can visit (e.g., scan) and process (e.g., convert to a phase-only value) $P_{u_j-1;v_j-1}$, and can update $P_{u_j;v_j}$ (e.g., an unvisited neighbor pixel) based at least in part on the coefficient $w_4$; can visit (e.g., scan) and process $P_{u_j-1;v_j}$, and can update $P_{u_j;v_j}$ (e.g., an unvisited neighbor pixel) based at least in part on the coefficient $w_3$; can visit (e.g., scan) and process $P_{u_j-1;v_j+1}$, and can update $P_{u_j;v_j}$ (e.g., an unvisited neighbor pixel) based at least in part on the coefficient $w_2$; and can visit (e.g., scan) and process $P_{u_j;v_j-1}$, and can update $P_{u_j;v_j}$ based at least in part on the coefficient $w_1$. The resulting updated value of $P_{u_j;v_j}$ can be the weighted sum of the updates to $P_{u_j;v_j}$ resulting from the processing of its four neighboring pixels (e.g., $P_{u_j-1;v_j-1}$, $P_{u_j-1;v_j}$, $P_{u_j-1;v_j+1}$, and $P_{u_j;v_j-1}$) and the diffusing of the respective errors of those four neighboring pixels to $P_{u_j;v_j}$.

Figure 7:
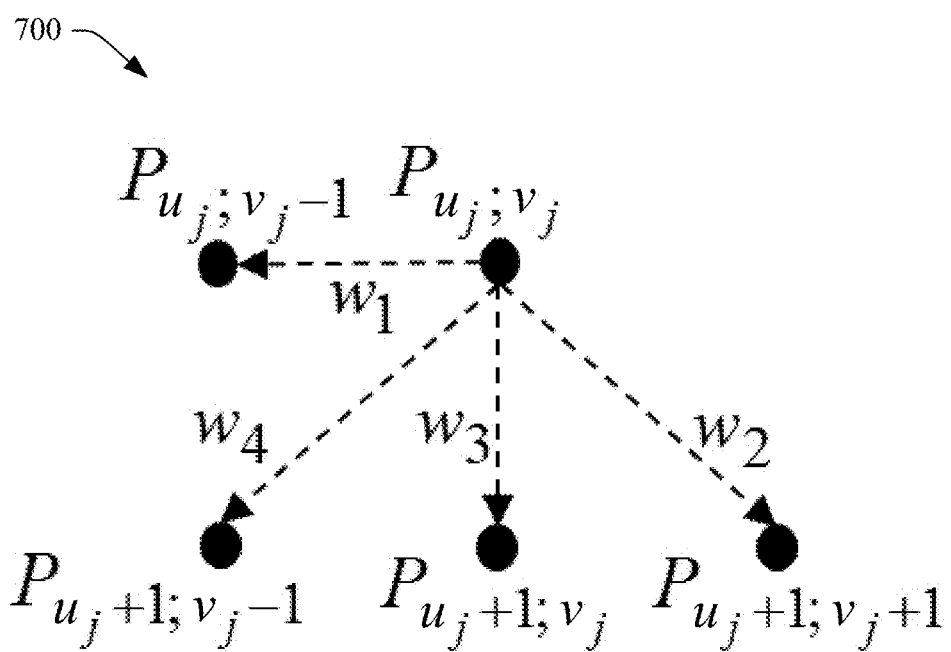
FIG. 7 presents a diagram of an example complex hologram portion that can depict the spatial relation between a pixel in an even row and its neighbor pixels for compensation of the error via error diffusion using the bi-directional error diffusion (BERD) process, in accordance with various aspects and embodiments of the disclosed subject matter.

FIG. 7 presents a diagram of an example complex hologram portion 700 that can depict the spatial relation between pixel $P_{u_j;v_j}$ in an even row and its neighbor pixels for compensation of the error via error diffusion using the BERD process, in accordance with various aspects and embodiments of the disclosed subject matter. In the example complex hologram portion 700, the row $u_j$ can be an even row of the complex hologram. In accordance with the BERD process, the hologram cryptographic component 102 can proceed to scan and process the pixels of the row $u_j$ (e.g., an even row) in a right to left manner. For example, in accordance with the BERD process, the hologram cryptographic component 102 can visit (e.g., scan) and process (e.g., convert to a phase-only value) $P_{u_j;v_j}$. The hologram cryptographic component 102 also can update the complex value of $P_{u_j;v_j-1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_1$, for example, in accordance with (e.g., by performing calculations or modifying values based at least in part on) Equation (10); can update the complex value of $P_{u_j+1;v_j+1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_2$, for example, in accordance with Equation (11); can update the complex value of $P_{u_j+1;v_j}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_3$, for example, in accordance with Equation (12); and can update the complex value of $P_{u_j+1;v_j-1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_4$, for example, in accordance with Equation (13).

In accordance with the disclosed BERD process, the hologram cryptographic component 102 can scan and process the pixels in the complex hologram, and diffuse the respective error associated with the respective pixels, to generate the resulting phase hologram, based at least in part on the processing of the odd rows of the complex hologram, in accordance with Equations (6) through (9), and the processing of the even rows of the complex hologram, in accordance with Equations (10) through (13). The resulting phase hologram can be referred to as a BERD hologram or BERD phase hologram.

It is to be appreciated and understood that, while the disclosed subject matter describes that the hologram cryptographic component 102 can scan and process pixels in the odd rows of the complex hologram, in accordance with Equations (6) through (9), and scan and process pixels in the even rows of the complex hologram, in accordance with Equations (10) through (13), the disclosed subject matter is not so limited. In accordance with various other implementations, the hologram cryptographic component 102 alternatively can scan and process pixels in the even rows of the complex hologram, in accordance with Equations (6) through (9), and scan and process pixels in the odd rows of the complex hologram, in accordance with Equations (10) through (13) (e.g., an alternate BERD process); or can perform another technique or process that can scan and process pixels of the complex hologram to convert complex values of pixels of the complex hologram to phase values, can facilitate diffusing error resulting from converting the complex values of pixels to phase values to their respective neighbor pixels in the complex hologram, and can facilitate interrupting, reducing, minimizing, or counteracting correlated error that may develop during the scanning and processing of pixels in a row of the complex hologram, in accordance with the disclosed subject matter.

With regard to the BERD process, LERDR process, and UERD process disclosed herein, the respective BERD, LERDR, and UERD processes assume that all of the pixels in the phase-only display device are normal (e.g., each pixel will exhibit a phase shift that is proportional to the value applied to it). The hologram cryptographic component 102 also can include a means to facilitate decreasing the sensitivity of the phase hologram towards dead pixels (e.g., pixels that are opaque, or transparent with no phase shift, or a constant phase shift that is independent to the value applied to the pixel). Such dead pixels commonly can be found in many display devices due to the imperfection in manufacturing, and their positions and defective values can be evaluated beforehand. Dead pixels in a phase-only display device can be classified into 3 main types. For a dead pixel that is opaque, the hologram cryptographic component 102 can set or modify the values (e.g., complex and imaginary parts) of such dead pixel to zero. For a dead pixel that is transparent with no phase shift, the hologram cryptographic component 102 can set or modify the real part and imaginary part of the dead pixel's value to unity (e.g., one) and zero, respectively. For a dead pixel with a constant phase shift $\phi$, the hologram cryptographic component 102 can set or modify the values of the dead pixel's real part and imaginary part to $\cos(\phi)$ and $\sin(\phi)$, respectively.

The error that can result from a pixel value, regardless of whether it is a normal pixel or a dead pixel, can be calculated, for example, in accordance with Equation (5). For a particular pixel of a complex hologram that is being scanned, the hologram cryptographic component 102 can diffuse such error to the pixels (e.g., neighbor pixels) that are normal in its neighborhood, via the BERD process, LERDR process, or UERD process, as disclosed herein.

In addition, the hologram cryptographic component 102 can increase the weighting factor by a factor C that can be greater than 1. In some implementations, by assuming or deeming that $$\sum_{k=1}^{4} w_k = 1,$$

the hologram cryptographic component 102 (or another component) can derive the factor C from the reciprocal of the sum of weighting factors associated with the normal pixel(s).

Figure 8:
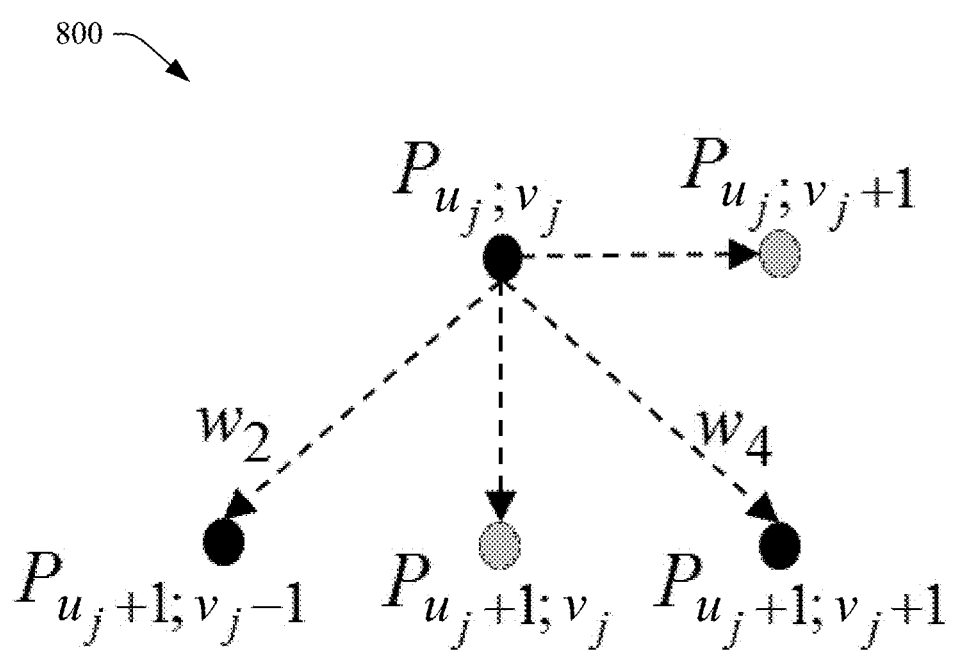
FIG. 8 illustrates a diagram of an example hologram portion comprising dead pixels to facilitate illustrating how dead pixels can be managed during processing of pixels of a complex hologram, in accordance with various aspects and embodiments of the disclosed subject matter.

FIG. 8 presents a diagram of an example complex hologram portion 800 comprising dead pixels to facilitate illustrating how the hologram cryptographic component 102 manages dead pixels during processing of pixels of a complex hologram, in accordance with various aspects and embodiments of the disclosed subject matter. As depicted in the example complex hologram portion 800, pixels $P_{u_j;v_j+1}$ and $P_{u_j+1;v_j}$ (highlighted in grey tone) can be dead pixels. In such instance, the hologram cryptographic component 102 can determine that it will only diffuse the error of pixel $P_{u_j;v_j}$ to pixels $P_{u_j+1;v_j-1}$ and $P_{u_j+1;v_j+1}$. The hologram cryptographic component 102 also can determine that it will increase the coefficients $w_2$ and $w_4$ by a factor $$C = \frac{1}{(w_2 + w_4)}$$

and can the hologram cryptographic component 102 can increase the coefficients $w_2$ and $w_4$ by a factor $$C = \frac{1}{(w_2 + w_4)},$$

accordingly. If it happens that all of the four neighbor pixels associated with the scanned and converted (e.g., to phase value) pixel are dead pixels, the hologram cryptographic component 102 will not diffuse the error of the scanned and converted pixel to its neighbor pixels.

During the third stage of the SRPE process, after the complex hologram has been converted into a phase hologram, the holographic cryptographic component 102 can modify, integrate, and/or multiply the phase hologram by or with a random phase mask to generate an SRP hologram. For example, the holographic cryptographic component 102 can multiply the phase hologram with a random phase mask, $e^{i\Theta(u,v)}$, to generate an SRP hologram, $H_{enc}(u,v)$, in accordance with Equation (15) as follows, $$H_{enc}(u,v) = H_p(u,v) e^{i\Theta(u,v)}. \qquad (15)$$

The SRP hologram can be regarded as being the encrypted (e.g., ciphertext) hologram, with the random phase mask, $e^{i\Theta(u,v)}$, being regarded as the private encryption key. When the encrypted hologram is overlaid or otherwise associated with (e.g., modified by, applied to, integrated with, multiplied by) the conjugate (e.g., conjugate phase mask) of the random phase mask (e.g., by a holographic cryptographic component (e.g., 302) at the decoding end) to decrypt the encrypted hologram to generate a decrypted hologram, and illuminated with a coherent beam (e.g., by a holographic cryptographic component (e.g., 302) or display component (e.g., 314) at the decoding end), the global image, together with the source image within it, can be reconstructed. The decryption process employed by the holographic cryptographic component (e.g., 302) at the decoding end can be realized optically or numerically.

As illustrated in the disclosed subject matter, the reconstructed holographic image(s), generated based at least in part on the phase hologram derived from the BERD process, LERDR process, or UERD process can have a favorable visual quality (e.g., a desirably high fidelity) that can be of substantially similar visual quality as compared to the visual quality of a reconstructed holographic image(s) that can be obtained using the original complex hologram. For instance, the reconstructed holographic images can be free or at least substantially free from zero-order diffraction, twin images, or other problems associated with certain conventional methods or techniques for hologram generation and display. Further, in contrast to conventional methods or techniques, no further processing (e.g., no additional hologram generation processing, such as, for example, quantization or other type of hologram generation processing) is necessary after the hologram is generated, as the recorded 3-D holographic image can be reconstructed by illuminating the phase hologram (e.g., POH, phase-specific, or pure phase hologram) via a display device (e.g., phase-only SLM display device) with a coherent beam of light.

With further regard to the display component 314 of FIG. 3, the display component 314 can be electronically accessible. The holographic cryptographic component 302 can be associated with (e.g., communicatively connected to) the display component 314 and can provide (e.g., communicate) the decrypted hologram (e.g., the 3-D phase hologram) to the display component 314, for example, at video rate or a faster rate in real or near real time. In some implementations, the phase hologram can be on recorded media (e.g., 2-D media, such as film), and the holographic cryptographic component 302 can provide the phase hologram via the recorded media, as disclosed herein.

In some implementations, the display component 314 can facilitate generating, reconstructing, reproducing, or presenting holographic images (e.g., full-parallax 3-D Fresnel holographic images) that can represent or recreate the original source images, based at least in part on the phase hologram, and can present (e.g., display) the holographic images for viewing by one or more viewers from various visual perspectives of the original object scene (e.g., multi-dimensional (e.g., 2-D or 3-D) object scene) associated with the original source images. In certain implementations, the holographic cryptographic component 302 and the display component 314 can operate in conjunction with each other to facilitate generating, reconstructing, reproducing, or presenting the holographic images that can represent or recreate the original source images, based at least in part on the phase hologram, for presentation, by the display component 314. The display component 314 can be or can comprise a display device(s), such as an SLM display device or an LCoS display device that can be used to facilitate displaying holographic images (e.g., full-parallax 3-D holographic images) that can be reconstructed using the phase hologram. In some implementations, the display component 314 can be or can comprise a phase-only or phase-specific display device(s) (e.g., phase-only SLM display device).

In some implementations, the display component 314 can include one or more display units (e.g., one or more electronically accessible display units, wherein each pixel of a display unit(s) can be electronically accessible), wherein each display unit can be a phase-only display device, such as a phase-only SLM display device or a phase-only LCoS display device. In other implementations, the display component 314 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from phase holograms), to facilitate displaying (e.g., real time displaying) of holographic images.

Additionally and/or alternatively, if desired, a hologram can be produced (e.g., by a holographic cryptographic component or another component) onto a desired material (e.g., onto film using photographic techniques) so that there can be a hard copy of the hologram that can be used to reproduce the holographic images at a desired time. In some implementations, the holographic cryptographic component 102 at the encoding end can generate the digital hologram (e.g., the 3-D phase hologram) using a single static media, such as a photographic film or a printout, comprising information relating to the digital hologram. The display component 314 can display holographic images that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 314 or other display components (e.g., remote display components, such as a 3-D TV display) to facilitate generation (e.g., reconstruction, reproduction) and display of the holographic images of the original source images) so that the holographic images can be presented to desired observers.

The system 100, system 300, and/or other systems, methods, devices, processes, techniques, etc., of the disclosed subject matter can be employed in any of a number of different applications. Such applications can include, for example, a 3-D holographic video system, desktop ornaments, attractions in theme parks, live stage or concerts, other entertainment-related applications or purposes, educational applications or purposes, a holographic studio, scientific research, other professional applications or purposes, encryption, watermarking, etc.

Figure 9:
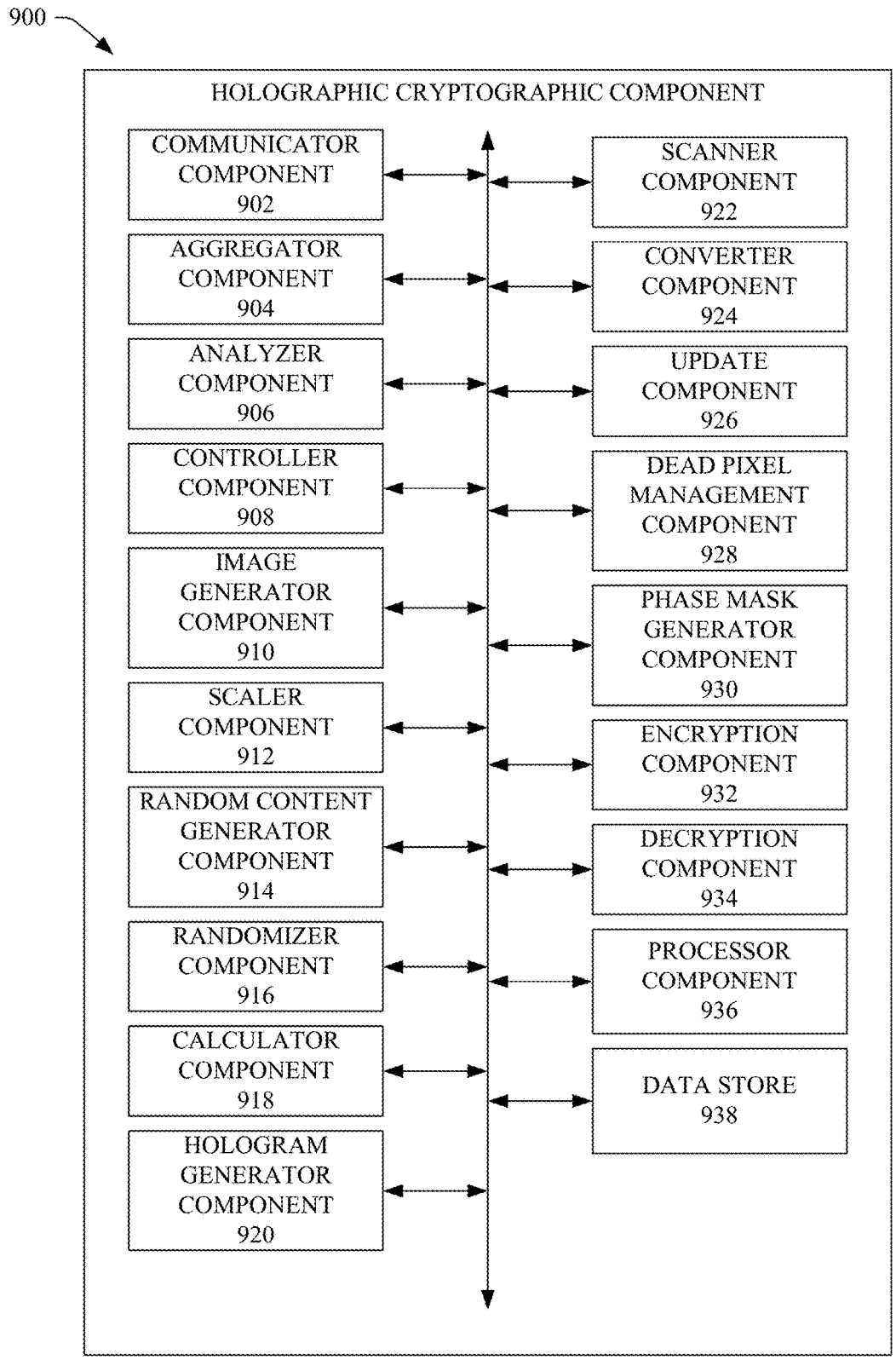
FIG. 9 illustrates a block diagram of an example holographic cryptographic component that that can facilitate performing desirable encryption and decryption of content using a holographic cryptographic process, in accordance with various aspects and embodiments of the disclosed subject matter.

FIG. 9 illustrates a block diagram of an example holographic cryptographic component 900 that that can facilitate performing desirable encryption and decryption of content (e.g., multi-dimensional visual images) using a holographic cryptographic process, in accordance with various aspects and embodiments of the disclosed subject matter.

The holographic cryptographic component 900 can include a communicator component 902 that can be used to communicate (e.g., transmit, receive) information between the holographic cryptographic component 900 and other components (e.g., display component(s), another holographic cryptographic component(s), scene capture device(s), processor component(s), user interface(s), data store(s), etc.). The information can include, for example, a visual image or set of visual images, a real or synthetic 3-D object scene, holograms or holographic images, information relating defined hologram generation criterion(s), information relation to an algorithm(s) (e.g., BERD algorithm, LERDR algorithm, UERD algorithm, etc.) that can facilitate generation of holograms or holographic images, encrypted holograms, etc.

The holographic cryptographic component 900 can comprise an aggregator component 904 that can aggregate data received (e.g., obtained) from various entities (e.g., another holographic cryptographic component(s), scene capture device(s), display component(s), processor component(s), user interface(s), data store(s), etc.). The aggregator component 904 can correlate respective items of data based at least in part on type of data, source of the data, time or date the data was generated or received, object point with which data is associated, row (e.g., first row, second row, third row, etc.; odd row, even row) in a hologram (e.g., complex hologram) to which a member (e.g., pixel) belongs, segment in a row to which a member belongs (e.g., first segment in first row, second segment in first row, third segment in first row, etc.), member of a hologram for which another member(s) is a neighbor member, pixel with which a transparency level is associated, visual perspective with which data is associated, a global image with which a scaled source image or random content is to be associated, a phase hologram with which an item (e.g., random phase mask) is to be associated, etc., to facilitate processing of the data (e.g., analyzing of the data by the analyzer component 906).

The analyzer component 906 can analyze data to facilitate scaling a source image, generating a global image, generating random content, randomizing a global image to include a scaled source image and random content, generating a phase hologram that can represent a randomized global image, generating a random phase mask, encrypting a phase hologram with a random phase mask, generating a conjugate phase mask, decrypting an encrypted hologram using a conjugate phase mask, reconstructing a source image from the decrypted hologram, etc. The analyzer component 906 also can analyze data to facilitate converting complex values of members (e.g., pixels) in a complex hologram to phase values (e.g., phase-only or phase-specific values), setting coefficients and/or weightings in connection with diffusing an error associated with a member to its neighbor members, updating values of specified neighbor members of a member in the complex hologram to facilitate diffusing an error associated with the member due to the conversion to the specified neighbor members of the member, redistributing an error associated with a last member of a hologram segment to an adjacent hologram segment, generating a phase hologram (e.g., a POH, phase-specific hologram, or pure phase hologram) associated with a global image comprising a scaled source image based at least in part on a complex hologram of the global image, identifying a dead pixel(s) in a complex hologram, setting values (e.g., values for the real part and imaginary part) for a dead pixel(s), setting coefficients and/or weightings in connection with a dead pixel(s), and/or identifying elements (e.g., object points, features, etc.) of an image or associated object scene to facilitate generating a hologram (e.g., phase hologram), etc.

The analyzer component 906 can generate analysis results, based at least in part on the data analysis. Based at least in part on the results of this analysis, the holographic cryptographic component 900 (e.g., one or more components of the holographic cryptographic component 900) can scale a source image, generate a global image, generate random content, randomize a global image, generate a complex hologram of a randomized global image, convert a complex hologram to a phase hologram, generate a random phase mask, encrypt the phase hologram using a random phase mask, generate a conjugate phase mask, decrypt an encrypted hologram using the conjugate phase mask, or reconstructing a source image from a decrypted hologram. Also, based at least in part on the results of this analysis, the holographic cryptographic component 900 can generate a complex hologram based at least in part on a source image, convert complex values of members of a complex hologram to phase values (e.g., in parallel), determine and/or set coefficients and/or weightings in connection with diffusing an error associated with a member to its neighbor members, update values of specified neighbor members of a member (e.g., with its complex value converted to a phase value) in the complex hologram to facilitate diffusing an error associated with the member due to the conversion to the specified neighbor members of the member, redistribute an error associated with a last member of a hologram segment to an adjacent (e.g., a neighbor) hologram segment, generate a phase hologram associated with a global image comprising a scaled source image based at least in part on the complex hologram, identify a dead pixel(s) in a complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a source image or associated object scene to facilitate generating a hologram, or perform other processes on data relating to holograms.

The holographic cryptographic component 900 also can comprise, for example, a controller component 908, an image generator component 910, a scaler component 912, a random content generator component 914, a randomizer component 916, a calculator component 918, a hologram generator component 920, a scanner component 922, a converter component 924, an update component 926, a dead pixel management component 928, a phase mask generator component 930, an encryption component 932, and/or a decryption component 934.

The controller component 908 can control operations relating to processing and generating encrypted holograms that can comprise an encrypted version of a source image, and decrypting encrypted holograms, in accordance with a desired holographic cryptographic process. The controller component 908 can facilitate controlling operations being performed by various components of the holographic cryptographic component 900, controlling data flow between various components of the holographic cryptographic component 900, controlling data flow between the controller component 908 and other components of the holographic cryptographic component 900, etc.

The image generator component 910 can facilitate generating or processing images, such as source images or global images. For instance, an image generator component 910 can process a source image in connection with the scaler component 912 to facilitate scaling the dimensions of the source image to generate a scaled source image. The scaler component 912 can modify or scale the dimensions (e.g., length, width, and/or depth) of the source image by respective defined scaling factors (e.g., random scaling factors) for the respective dimensions to generate a desired scaled source image. The random scaling factors can be determined based at least in part on a randomizing function and/or random number (e.g., random or pseudo-random number) employed or generated by the randomizer component 916. The image generator component 910 also can generate a global image that can have dimensions that are larger than the dimensions of the source image and/or scaled source image. The image generator component 910 further can (e.g., randomly) incorporate, insert, or paste the scaled source image in a desired (e.g., random) position within the global image. For instance, the image generator component 910 can place the scaled source image in a random position within the global image that can be determined based at least in part on a randomizing function and/or random number employed or generated by the randomizer component 916.

The random content generator component 912 can generate one or more items of random content (e.g., random alphanumeric characters, shapes, images, and/or objects) based at least in part on a randomizing function and/or random number employed or generated by the randomizer component 916. For example, the random content generator component 912 can randomly generate letters, numbers, objects (e.g., arrow, baseball, football), shapes (e.g., circle, square, rectangle, triangle), images (e.g., visual image of a holiday tree, visual image of a car), or other content. The image generator component 910 can randomly incorporate, insert, or paste the one or more items of random content within one or more desired locations within the global image that are not occupied by the scaled source image, for example, based at least in part on a randomizing function and/or random number employed or generated by the randomizer component 916.

The calculator component 918 can perform calculations on data (e.g., data with respective values), in accordance with various equations (e.g., mathematical expressions), to facilitate generating an image (e.g., a global image), generating a complex hologram, generating a phase hologram based at least in part on a complex hologram, converting a complex value of a member of a complex hologram to a phase value, determining or calculating coefficients or weightings associated with diffusing an error associated with a member to its neighbor members, updating complex values of specified neighbor members of a member that has had its complex value converted to a phase value, redistributing an error associated with a last member of a hologram segment to an adjacent hologram segment, determining or calculating values for dead pixels, determining or calculating coefficients or weightings associated with dead pixels, associating a random phase mask with a phase hologram, associating a conjugate phase mask with an encrypted hologram, and/or performing other operations. The calculator component 918 can facilitate performing calculations and generating calculation results using one or more equations, including the equations disclosed herein, relating to generating images, generating or processing phase holograms, encrypting phase holograms, decrypting encrypted holograms, reconstructing images, etc.

The hologram generator component 920 can facilitate generating a complex hologram that can represent a source image(s) or an associated object scene at a desired rate (e.g., at video rate or a faster rate (e.g., approximately 40 frames per second or faster)), for example, using one or more of the fast hologram generation techniques, processes, or methods, such as disclosed herein. The hologram generator component 920 also can facilitate processing a complex hologram to generate a phase hologram that can correspond to the complex hologram at a desired rate (e.g., at video rate or a faster rate (e.g., approximately 40 frames per second or faster)).

The scanner component 922 can visit, scan, analyze, or examine members (e.g., pixels) of segments of a complex hologram to facilitate converting the complex values of members to phase values. The scanner component 922 also can facilitate determining the complex values of respective members of the complex hologram. The scanner component 922 can scan members of a complex hologram, in accordance with, for example, a BERD process, an LERDR process, or a UERD process, as more fully disclosed herein. For example, when the BERD process is employed, the scanner component 922 can visit, scan, analyze, or examine members of an odd row of a complex hologram in a first direction (e.g., left-to-right direction), and can visit, scan, analyze, or examine members of an even row of the complex hologram in a second direction (e.g., right-to-left direction). When the LERDR process is employed, the scanner component 922 can visit, scan, analyze, or examine members of segments of a complex hologram in segment by segment, and row by row manner (e.g., scanning pixels in a first segment of a first row, scanning pixels in a second segment of the first row, and so on), for example, in a left to right manner (e.g., by scanning a pixel in a row, scanning a next pixel that is to the right of the pixel in the row, and so on), or alternatively, in a right to left manner (e.g., by scanning a pixel in a first segment of a first row, scanning a next pixel that is to the left of the pixel in that segment, and so on). When the UERD process is employed, the scanner component 922 can visit, scan, analyze, or examine members of a complex hologram in a row by row manner (e.g., scanning pixels in a first row, scanning pixels in a second row, and so on), for example, in a left to right manner (e.g., by scanning a pixel in a row, scanning a next pixel that is to the right of the pixel in the row, and so on).

The converter component 924 can convert the complex value of a member of a hologram to a phase value (e.g., a phase-only or phase-specific value). For instance, the converter component 924 can set or modify the magnitude of each member to a desired constant value (e.g., a value of unity, so that the magnitude component of the member can be transparent), which can remove the magnitude information, for example, in accordance with Equation (4).

The update component 926 can facilitate updating the complex values of certain (e.g., specified, not yet visited) neighbor members in a complex hologram that are in proximity to a member that has had its complex value modified or converted to a phase value. The update component 926 can perform the updates of the complex values of these certain neighbor members to facilitate diffusing an error, which is associated with the conversion of the complex value of the member to the phase value, to these certain neighbor members, as more fully disclosed herein (e.g., in accordance with the applicable equations disclosed herein, and the processes (e.g., BERD process, LERDR process, UERD process) disclosed herein).

The dead pixel management component 928 can be employed to facilitate managing any dead pixels that are identified or detected in a complex hologram. The dead pixel management component 928 can facilitate decreasing the sensitivity of a phase hologram towards dead pixels (e.g., pixels that are opaque, or transparent with no phase shift, or a constant phase shift that is independent to the value applied to the pixel). For example, for a dead pixel that is opaque, the dead pixel management component 928 can set or modify the values (e.g., complex and imaginary parts) of such dead pixel to zero. For a dead pixel that is transparent with no phase shift, the dead pixel management component 928 can set or modify the real part and imaginary part of the dead pixel's value to unity (e.g., one) and zero, respectively. For a dead pixel with a constant phase shift $\phi$, the dead pixel management component 928 can set or modify the values of the dead pixel's real part and imaginary part to $\cos(\phi)$ and $\sin(\phi)$, respectively. The dead pixel management component 928 also can facilitate determining or modifying weighting factors or coefficient values applied during an error diffusing process to facilitate accounting for the dead pixels, as more fully disclosed herein.

At the encryption end, the phase mask generator component 930 can generate a random phase mask that can be used as a private encryption key to encrypt a phase hologram associated with a source image to facilitate generating an encrypted hologram. For instance, the phase mask generator component 930 can generate a random phase mask based at least in part on a randomizing function and/or random number employed or generated by the randomizer component 916. At the decryption end, with respect to an encrypted hologram, the phase mask generator component 930 can generate a phase mask, such as a conjugate phase mask, that can inversely correspond to or can be the conjugate of a random phase mask that was used to encrypt a phase hologram to generate the encrypted hologram.

The encryption component 932 can encrypt a phase hologram associated with a source image to generate an encrypted hologram based at least in part on a random phase mask. For example, the encryption component 932 can apply, add, integrate, multiply, or otherwise associate the random phase mask to, with, or by the phase hologram to generate the encrypted hologram.

At the decryption end, the decryption component 934 can decrypt an encrypted hologram associated with a source image (e.g., comprising an encrypted version of the source image) based at least in part on a phase mask. For instance, the decryption component 934 can apply, integrate, overlay, multiply, or otherwise associate the phase mask (e.g., conjugate phase mask with respect to the random phase mask) to, with, or by the encrypted hologram to decrypt the encrypted hologram.

The holographic cryptographic component 900 also can comprise a processor component 936 that can operate in conjunction with the other components (e.g., communicator component 902, aggregator component 904, analyzer component 906, controller component 908, and/or other components of the holographic cryptographic component 900) to facilitate performing the various functions of the holographic cryptographic component 900. The processor component 936 can employ one or more processors (e.g., central processing units (CPUs), GPUs, FPGAs, etc.), microprocessors, or controllers that can process data, such as information (e.g., visual information) relating to a visual image (e.g., source image, global image) or associated object scene (e.g., 2-D or 3-D object scene), holographic data, data relating to parameters associated with the holographic cryptographic component 900 and associated components, etc., to facilitate generating images, randomizing a global image, generating holograms (e.g., full-parallax complex 3-D Fresnel hologram, phase hologram based on the complex hologram) and corresponding holographic images representative of a source image or associated object scene, encrypting holograms using a random phase mask, and/or decrypting encrypted holograms using a conjugate phase mask with respect to a random phase mask; and can control data flow between the holographic cryptographic component 900 and other components associated with the holographic cryptographic component 900.

In yet another aspect, the holographic cryptographic component 900 can contain a data store 938 that can store data structures (e.g., user data, metadata); code structure(s) (e.g., modules, objects, classes, procedures), commands, or instructions; information relating to object points; information relating to (e.g., representative of) an image (e.g., source image, global image) or associated object scene; model data; holographic data; information relating to generating a hologram, converting a complex value of a member of a complex hologram to a phase value, diffusing an error associated with a member to certain neighbor members of the member, managing dead pixels in a complex hologram, etc.; information relating to generating a phase mask (e.g., random phase mask, conjugate phase mask); information relating to encrypting a hologram; information relating to decrypting an encrypted hologram; parameter data; algorithms (e.g., algorithm(s) relating to fast generation of holograms at a desired rate (e.g., at video rate or faster); algorithm(s) relating to generating a complex hologram; BERD algorithm; LERDR algorithm; UERD algorithm); criterion(s) relating to hologram generation; and so on. In an aspect, the processor component 936 can be functionally coupled (e.g., through a memory bus) to the data store 938 in order to store and retrieve information desired to operate and/or confer functionality, at least in part, to the communicator component 902, aggregator component 904, analyzer component 906, controller component 908, and/or other components of the holographic cryptographic component 900, and/or substantially any other operational aspects of the holographic cryptographic component 900. It is to be appreciated and understood that the various components of the holographic cryptographic component 900 can communicate information between each other and/or between other components associated with the holographic cryptographic component 900 as desired to carry out operations of the holographic cryptographic component 900. It is to be further appreciated and understood that respective components (e.g., communicator component 902, aggregator component 904, analyzer component 906, hologram processor component 908, and/or other components of the holographic cryptographic component 900) of the holographic cryptographic component 900 each can be a stand-alone unit, can be included within the holographic cryptographic component 900 (as depicted), can be incorporated within another component of the holographic cryptographic component 900 or a component separate from the holographic cryptographic component 900, and/or virtually any suitable combination thereof, as desired.

It is to be appreciated and understood that, in accordance with various other aspects and embodiments, the holographic cryptographic component 900 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a object scene and/or a hologram), a render component (e.g., to render or convert data, such as model data or diffraction pattern data, associated with an image (e.g., source image or associated global image) or associated object scene into corresponding holographic data, which can be used to generate a hologram that is a reproduction of the image or associated object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing an object scene.

Figure 10:
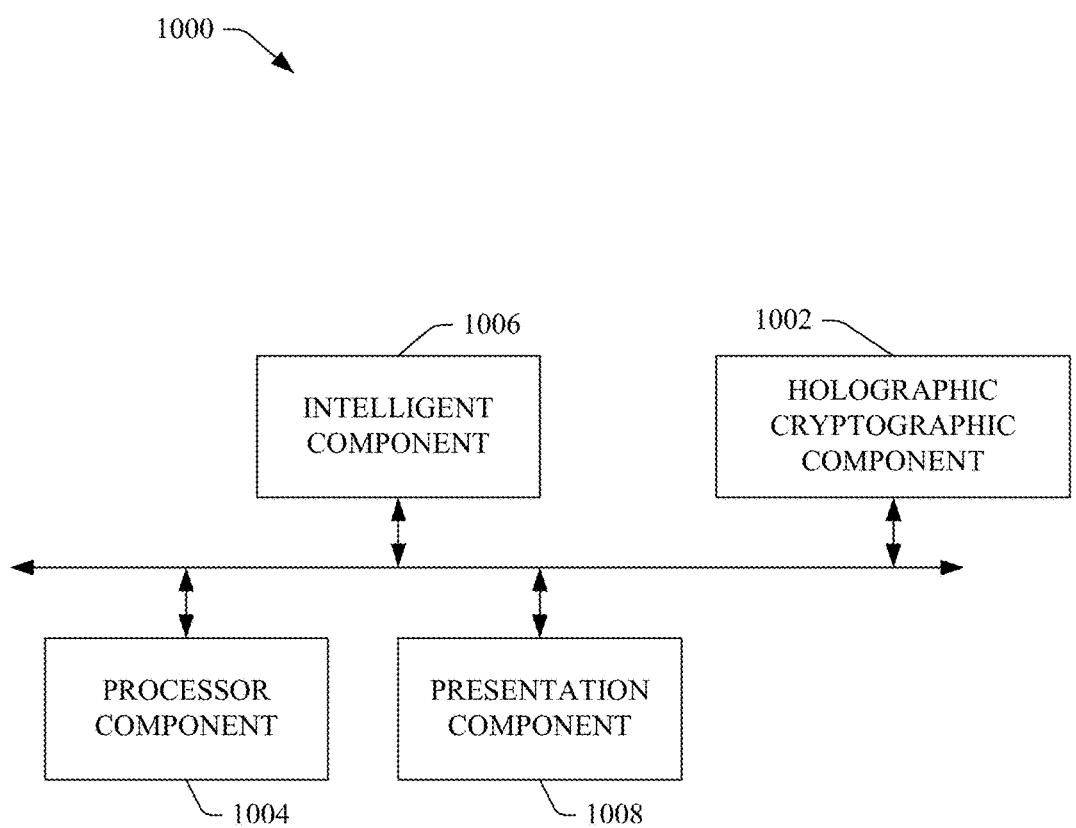
FIG. 10 depicted is a block diagram of a system that can employ intelligence to facilitate performing desirable encryption and decryption of content in accordance with a holographic cryptographic process, in accordance with various aspects and embodiments of the disclosed subject matter.

Referring to FIG. 10, depicted is a block diagram of a system 1000 that can employ intelligence to facilitate performing desirable encryption and decryption of content (e.g., multi-dimensional visual images) in accordance with a holographic cryptographic process, in accordance with various aspects and embodiments of the disclosed subject matter. The system 1000 can include a holographic cryptographic component 1002 that can encrypt a source image using a global image and randomization of a scaled version of the source image and random content within the global image (e.g., randomized global image), generating a phase hologram of the randomized global image, and using a random phase mask as the private encryption key with the phase hologram to generate an encrypted hologram, in accordance with a desired holographic cryptographic process, as more fully disclosed herein. At the decoding end, a holographic cryptographic component 1002 can decrypt the encrypted hologram using a conjugate phase mask. The decrypted hologram can be illuminated with a coherent light beam to reconstruct the source image and/or other content of the randomized global image, wherein the reconstructed source image can be displayed for viewing. It is to be appreciated that the holographic cryptographic component 1002 can be the same or similar as respective components (e.g., respectively named components), and/or can contain the same or similar functionality as respective components, as more fully described herein.

The system 1000 can further include a processor component 1004 that can be associated with (e.g., communicatively connected to) the holographic cryptographic component 1002 and/or other components (e.g., components of system 1000) via a bus. In accordance with an embodiment of the disclosed subject matter, the processor component 1004 can be an applications processor(s) that can manage communications and run applications. For example, the processor component 1004 can be a processor that can be utilized by a computer, mobile computing device, personal data assistant (PDA), or other electronic computing device. The processor component 1004 can generate commands in order to facilitate scaling a source image generating a global image, generating random content, randomizing the global image using the source image and random content, generating a complex hologram representing a randomized global image, converting a complex hologram to a phase hologram, diffusing respective errors of respective pixels of a complex hologram to respective neighbor pixels, redistributing an error associated with last pixels of hologram segments to respective adjacent segments, generating a random phase mask, associating the random phase mask with a phase hologram to generate an encrypted hologram, generating a conjugate phase mask in connection with a random phase mask, decrypting an encrypted hologram using the conjugate phase mask, reconstructing the source image from the decrypted hologram (e.g., via use of a coherent light beam) and/or displaying of the reconstructed source image, modifying parameters associated with the holographic cryptographic component 1002, etc.

The system 1000 also can include an intelligent component 1006 that can be associated with (e.g., communicatively connected to) the holographic cryptographic component 1002, the processor component 1004, and/or other components associated with system 1000 to facilitate analyzing data, such as current and/or historical information, and, based at least in part on such information, can make an inference(s) and/or a determination(s) regarding, for example, scaling a source image generating a global image, generating random content, randomizing the global image using the source image and random content, generating a complex hologram representing a randomized global image, converting a complex hologram to a phase hologram, converting a value of a pixel from a complex value to a phase value (e.g., a phase-only or phase-specific value), diffusing an error associated with converting a pixel to a neighbor pixel(s), redistributing an error associated with last pixels of hologram segments to respective adjacent segments, determining a conversion process (e.g., LERDR process, BERD process, UERD process, etc.) to perform on a complex hologram to convert it to a phase hologram, managing the diffusion of an error associated with converting a value of a pixel from a complex value to a phase value to neighbor pixels when a neighbor pixel(s) is a dead pixel(s), generating a random phase mask, associating the random phase mask with a phase hologram to generate an encrypted hologram, generating a conjugate phase mask in connection with a random phase mask, decrypting an encrypted hologram using the conjugate phase mask, reconstructing the source image from the decrypted hologram, determining and/or setting of parameters associated with the holographic cryptographic component 1002 and associated components, etc.

For example, based in part on current and/or historical evidence, the intelligent component 1006 can infer or determine a size a global image is to be, scaling to be applied to a source image, random content to be generated, the respective locations of a scaled source image or random content within the global image, a type of hologram conversion process (e.g., LERDR process, BERD process, UERD process, etc.) to employ to convert a complex hologram of the global image to a phase hologram, a random phase mask to be generated for use in encrypting a phase hologram of the global image, an operation to perform in connection with managing the diffusion of an error that is associated with converting a complex value of a pixel to a phase value to neighbor pixels when a neighbor pixel(s) is a dead pixel(s), a conjugate phase mask to be generated to decrypt an encrypted hologram to facilitate reconstructing the source image, respective parameter values of one or more parameters to be used with regard to the performing of operations by the holographic cryptographic component 1002, etc.

In an aspect, the intelligent component 1006 can communicate information related to the inferences and/or determinations to the holographic cryptographic component 1002. Based at least in part on the inference(s) or determination(s) made by the intelligent component 1006, the holographic cryptographic component 1002 can take (e.g., automatically or dynamically take) one or more actions to facilitate encrypting a source image or decrypting an encrypted hologram containing an encrypted version of the source image. For instance, the holographic cryptographic component 1002 can determine or identify a size a global image is to be, a scaling to be applied to a source image, random content to be generated, the respective locations of a scaled source image or random content within the global image, a type of hologram conversion process to employ to convert a complex hologram of the global image to a phase hologram, a random phase mask to be generated for use in encrypting a phase hologram of the global image, an operation to perform in connection with managing the diffusion of an error that is associated with converting a complex value of a pixel to a phase value to neighbor pixels when a neighbor pixel(s) is a dead pixel(s), a conjugate phase mask to be generated to decrypt an encrypted hologram to facilitate reconstructing the source image, respective parameter values of one or more parameters to be used with regard to the performing of operations by the holographic cryptographic component 1002, as disclosed herein.

It is to be understood that the intelligent component 1006 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=$confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1000 also can include a presentation component 1008, which can be connected with the processor component 1004. The presentation component 1008 can provide various types of user interfaces to facilitate interaction between a user and any component coupled to the processor component 1004. As depicted, the presentation component 1008 is a separate entity that can be utilized with the processor component 1004 and associated components. However, it is to be appreciated that the presentation component 1008 and/or similar view components can be incorporated into the processor component 1004 and/or can be a stand-alone unit. The presentation component 1008 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1004.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the holographic cryptographic component 1002 and/or other components, can be situated or implemented on a single integrated-circuit chip. In accordance with another embodiment, the holographic cryptographic component 1002, and/or other components, can be implemented on an application-specific integrated-circuit (ASIC) chip. In yet another embodiment, the holographic cryptographic component 1002 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 11:
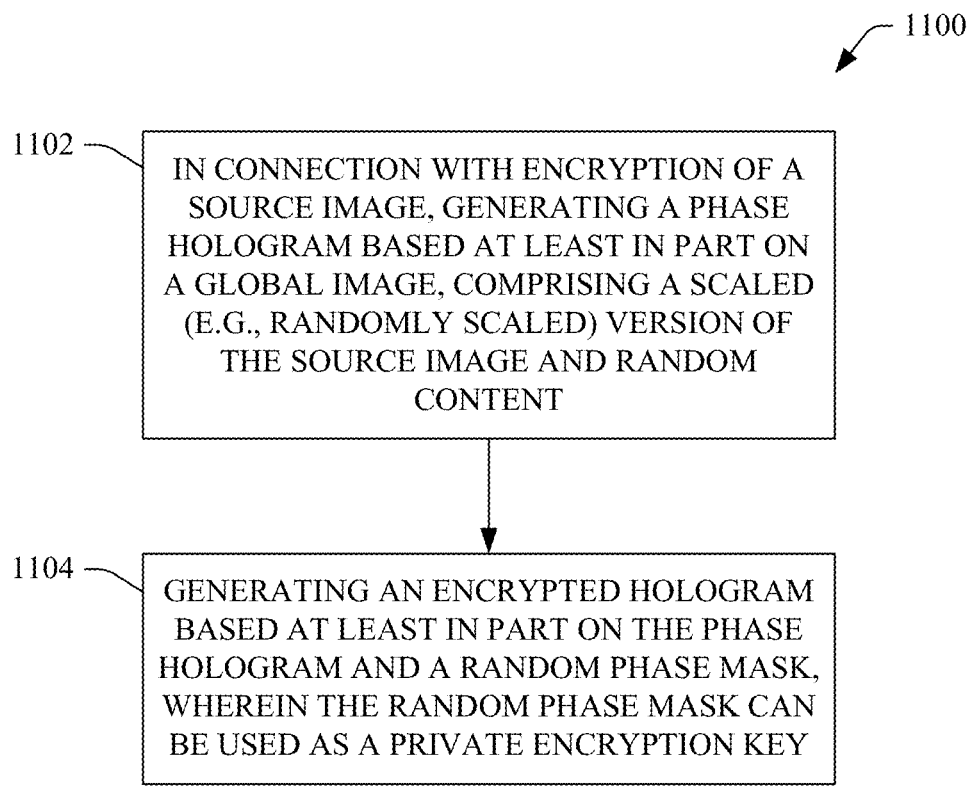
FIG. 11 illustrates a flow diagram of an example method that can facilitate encrypting content using a holographic cryptographic process, in accordance with various aspects and embodiments of the disclosed subject matter.
Figure 12:
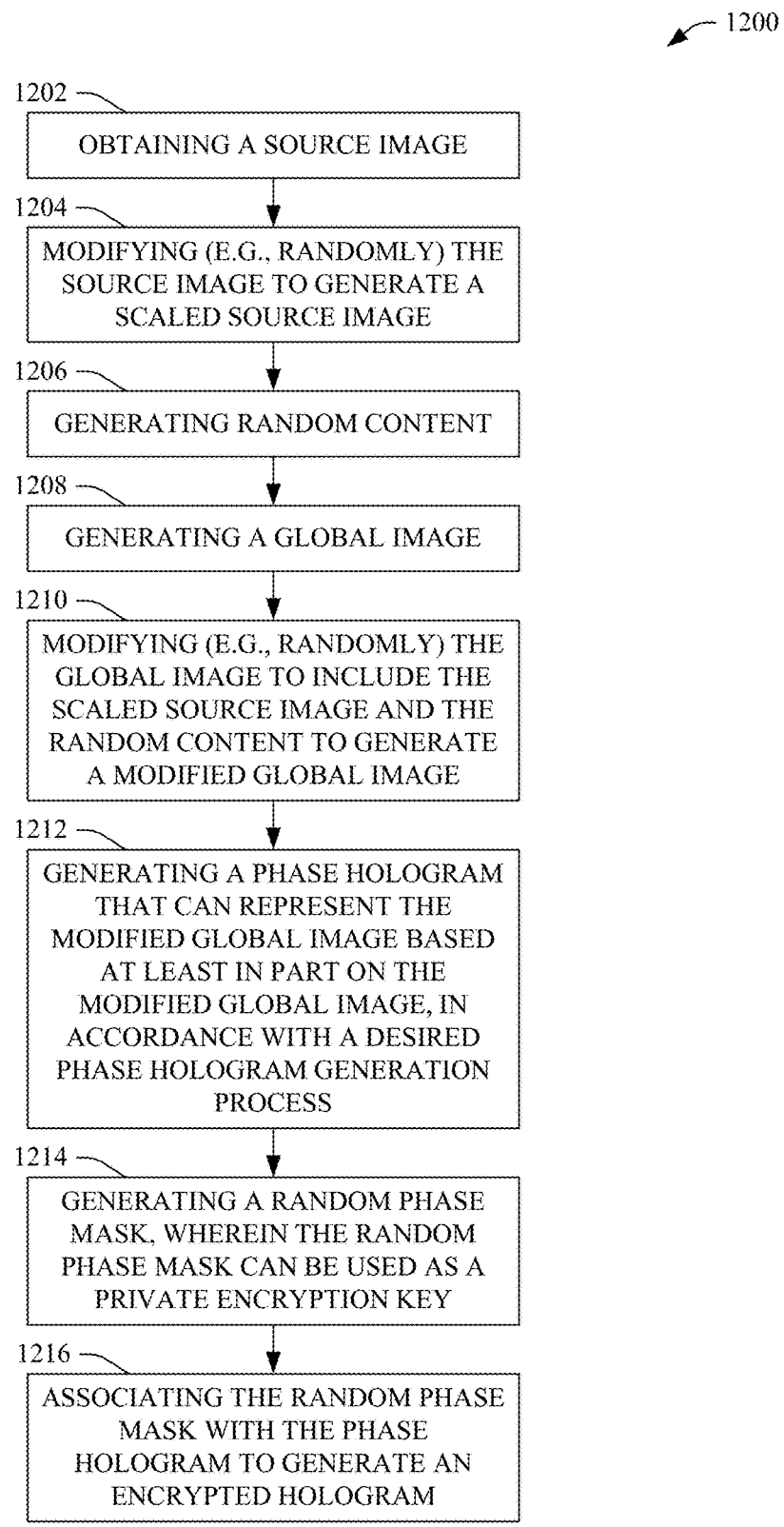
FIG. 12 illustrates a flow diagram of another example method that can facilitate encrypting content using a holographic cryptographic process, in accordance with various aspects and embodiments of the disclosed subject matter.
Figure 13:
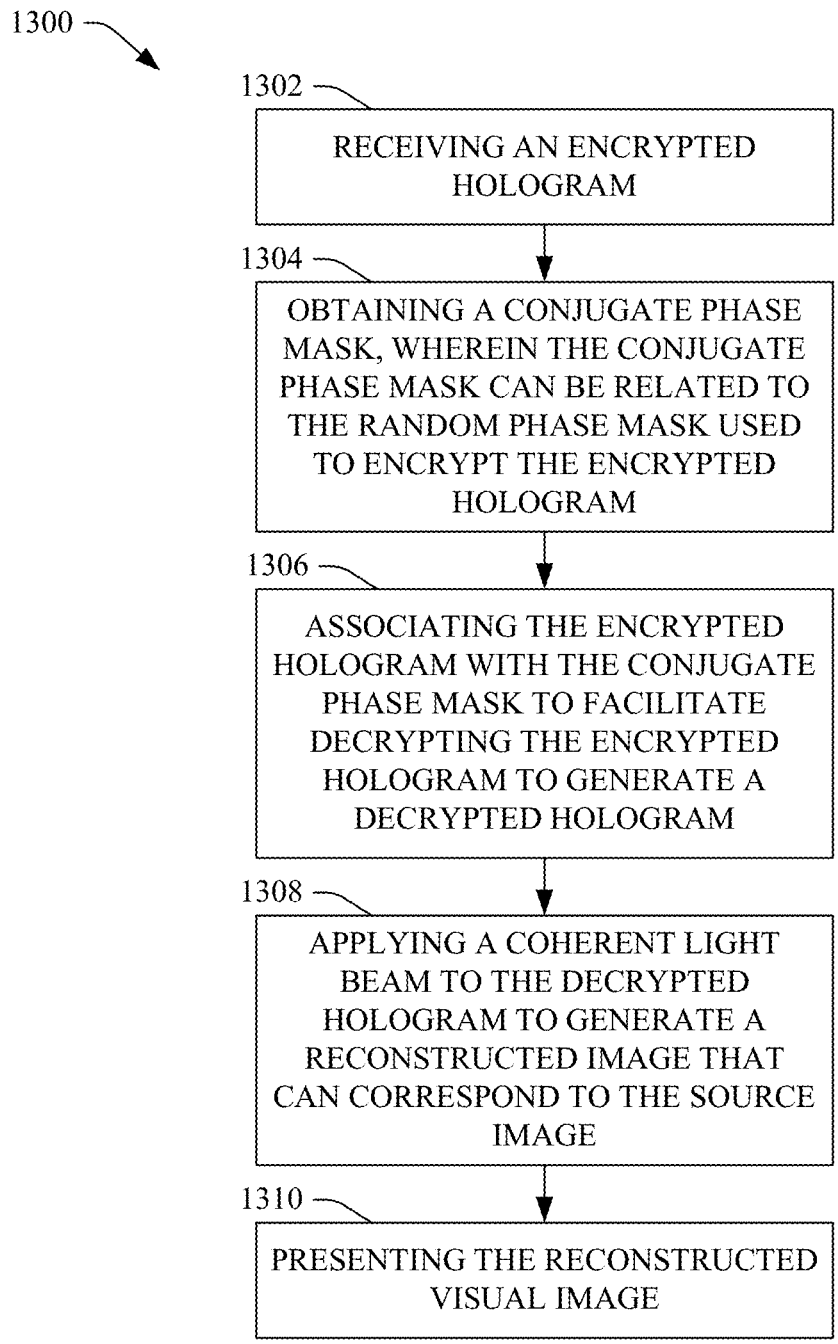
FIG. 13 depicts a flow diagram of an example method that can facilitate decrypting encrypted content using a holographic cryptographic process, in accordance with various aspects and embodiments of the disclosed subject matter.

FIGS. 11-13 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 11, illustrated is a flow diagram of an example method 1100 that can facilitate encrypting content (e.g., multi-dimensional visual images) using a holographic cryptographic process, in accordance with various aspects and embodiments of the disclosed subject matter. The method 1100 can be implemented by a holographic cryptographic component, for example.

At 1102, in connection with encryption of a source image, a phase hologram can be generated based at least in part on a global image, comprising a scaled (e.g., randomly scaled) version of the source image and random content. To facilitate encrypting the source image, the holographic cryptographic component can generate a global image, which can be larger in size than the source image. The holographic cryptographic component also can scale (e.g., randomly scale) the dimensions (e.g., length, width, and/or depth) of the source image by a defined scaling factor(s) to generate a scaled source image, wherein the scaled source image can be, for example, relatively modestly reduced in size as compared to the size of the source image. The holographic cryptographic component can determine (e.g., randomly determine) a position or location in the global image in which to insert or past the scaled source image, and can insert or paste the scaled source image into the determined (e.g., randomly determined) position or location in the global image. The holographic cryptographic component further can generate one or more pieces of random content (e.g., randomly generated text, numbers, images, shapes, objects) that can be inserted or pasted into one or more respective positions or locations of the global image, as determined (e.g., randomly determined) by the holographic cryptographic component, wherein the respective position(s) or location(s) of the random content in the global image can be in an area(s) of the global image that is not occupied by the scaled source image.

At 1104, an encrypted hologram can be generated based at least in part on the phase hologram and a random phase mask, wherein the phase hologram can represent the global image, comprising the scaled source image and the random content, and the random phase mask is used as a private encryption key. The holographic cryptographic component can generate a phase hologram of the global image, comprising the scaled source image and the random content, using a desired phase hologram generation process (e.g., BERD process, LERDR process, UERD process), as disclosed herein. The holographic cryptographic component can generate (e.g., randomly generate) a random phase mask to facilitate encrypting the source image associated with the phase hologram, wherein the random phase mask can be the private (e.g., secret) encryption key for the encrypted hologram being generated. The holographic cryptographic component can apply, add, integrate, multiply, or otherwise associate the random phase mask to, with, or by the phase hologram to generate an encrypted hologram (e.g., the ciphertext hologram) that can represent or correspond to the original source image (e.g., can comprise the original source image in encrypted form). The resulting encrypted hologram can be a white-noise ciphertext hologram that can be uncorrelated to the global image and the original source image.

At the decoding end, to reconstruct the original source image (e.g., multi-dimensional visual image), a holographic cryptographic component (e.g., another holographic cryptographic component at the decoding end) can receive the encrypted hologram, for example, from memory or via the communication link (e.g., from a holographic cryptographic component at the encoding end). At the decoding end, the holographic cryptographic component can overlay or associate a phase mask, which can inversely correspond to and/or be a conjugate of the encryption key, on or with the encrypted hologram, wherein the encrypted hologram, with the phase mask overlaid thereon or associated therewith, can be illuminated using a coherent light source to facilitate generating and displaying a reconstructed and decrypted multi-dimensional visual image (e.g., holographic image) that can represent or correspond to (e.g., at least can be substantially the same as) the original source image. The original source image only can be reconstructed properly if the correct phase mask is used.

FIG. 12 illustrates a flow diagram of another example method 1200 that can facilitate encrypting content (e.g., multi-dimensional visual images) using a holographic cryptographic process, in accordance with various aspects and embodiments of the disclosed subject matter. The method 1200 can be implemented by a holographic cryptographic component, for example.

At 1202, a source image can be obtained. The holographic cryptographic component can receive, generate, or otherwise obtain the source image, which can be a multi-dimensional image. The source image can be a single visual image not associated with other visual images (e.g., a photographic image or other solitary image), or can be one visual image of a number of (e.g., a series or sequence of) visual images (e.g., as part of a video or video stream).

At 1204, the source image can be modified (e.g., randomly scaled or adjusted in size) to generate a scaled source image. The holographic cryptographic component can modify or scale the respective dimensions (e.g., length, width, and/or depth) of the source image by respective defined scaling factors (e.g., random scaling factors) to generate the scaled source image, for example, as described herein, wherein the respective defined scaling factors of the respective dimensions can be the same as or different from each other.

At 1206, random content can be generated. The holographic cryptographic component can generate one or more items of random content. An item of random content can be text (e.g., one or more alphanumeric characters), a shape, an object, or an image that can be randomly generated by the holographic cryptographic component.

At 1208, a global image can be generated. The holographic cryptographic component can generate a global image (e.g., a 2-D or 3-D global image) that can have a defined size (e.g., defined length, width, and/or depth) that can be larger than the source image or at least larger than the scaled source image.

At 1210, the global image can be modified (e.g., randomly modified) to include the scaled source image and the random content to generate a modified global image (e.g., a randomized global image). The holographic cryptographic component can modify (e.g., change) the global image to include (e.g., insert, paste, incorporate) the scaled source image in a location (e.g., randomly determined location) within the global image and the one or more items of random content in one or more other locations (e.g., randomly determined location(s)) within the global image in an area other than the area occupied by the scaled source image.

At 1212, a phase hologram that can represent the modified global image can be generated based at least in part on the modified global image, in accordance with a desired phase hologram generation process. The holographic cryptographic component can employ a desired phase hologram generation process (e.g., BERD process, LERDR process, UERD process) to generate a phase hologram (e.g., a POH) that can represent or correspond to the modified global image based at least in part on the modified global image.

At 1214, a random phase mask can be generated, wherein the random phase mask can be used as a private encryption key. The holographic cryptographic component can generate (e.g., randomly generate) a phase mask (e.g., a random phase mask), wherein the phase mask can be employed as the private encryption key with respect to the phase hologram and encryption of the information (e.g., the source image) therein. For instance, the holographic cryptographic component can generate the random phase mask in accordance with (e.g., using) a desired randomization algorithm and/or a random or pseudo-random number generator.

At 1216, the random phase mask can be associated with the phase hologram to generate an encrypted hologram. The holographic cryptographic component can apply, add, integrate, multiply, or otherwise associate the random phase mask to, with, or by the phase hologram to generate the encrypted hologram. The encrypted hologram can be a ciphertext hologram or SRP hologram, for example.

The holographic cryptographic component can store the encrypted hologram in memory and/or on single static media, such as photographic film or a printout, and/or can communicate the encrypted hologram to another device or component (e.g., a holographic cryptographic component at the decoding end) via a wireline or wireless communication link for decrypting of the encrypted hologram and reconstructing of the source image at the decoding end.

Referring to FIG. 13, depicted is a flow diagram of an example method 1300 that can facilitate decrypting encrypted content (e.g., multi-dimensional visual images) using a holographic cryptographic process, in accordance with various aspects and embodiments of the disclosed subject matter. The method 1300 can be implemented by a holographic cryptographic component (e.g., at the decoding or decryption end), for example. In some implementations, the method 1300 can be realized optically or numerically.

At 1302, an encrypted hologram can be received. The holographic cryptographic component can receive the encrypted hologram from memory, another holographic cryptographic component or another component (e.g., via a wireless or wireline communication link), or from another source (e.g., memory).

At 1304, a conjugate phase mask can be obtained, wherein the conjugate phase mask can be related to the random phase mask used to encrypt the encrypted hologram. The holographic cryptographic component can generate, receive, or otherwise obtain the conjugate phase mask, wherein the conjugate phase mask can inversely correspond with, be the conjugate of, or otherwise be related to, the random phase mask used to encrypt the encrypted hologram at the encoding end. For example, the holographic cryptographic component can be associated with an authorized entity (e.g., authorized user or device) that is authorized to access the source image, and the conjugate phase mask associated with the encrypted hologram (and associated source image), or information that can facilitate generating the conjugate phase mask, can be provided to the holographic cryptographic component to enable the holographic cryptographic component to decrypt the encrypted hologram, which can comprise a modified global image, comprising the source image, in encrypted form, and reconstruct and display the source image (e.g., on a display screen of a display component).

At 1306, the encrypted hologram can be associated with the conjugate phase mask to facilitate decrypting the encrypted hologram to generate a decrypted hologram. The holographic cryptographic component can overlay, integrate, apply, multiply, or otherwise associate the conjugate phase mask on, with, or by the encrypted hologram to generate the decrypted hologram associated with the encrypted hologram. The conjugate phase mask can inversely correspond to or be the conjugate of the random phase mask used to encrypt the phase hologram to generate the encrypted hologram at the encoder end.

At 1308, a coherent light beam can be applied to the decrypted hologram to generate a reconstructed image that can correspond to the source image. The holographic cryptographic component or display component can generate a coherent light beam and can apply the coherent light beam to the decrypted hologram to illuminate the decrypted hologram to facilitate reconstructing a visual image (e.g., reconstructed global image) that can comprise a reconstructed visual image that can correspond to the original source image.

At 1310, the reconstructed visual image can be presented. The display component can present (e.g., display) the reconstructed visual image corresponding to the source image for viewing by one or more viewers. In some implementations, the display component can be or can comprise, for example, a phase-only display device (e.g., a phase-only SLM display device, a phase-only LCoS display device).

Figure 14:
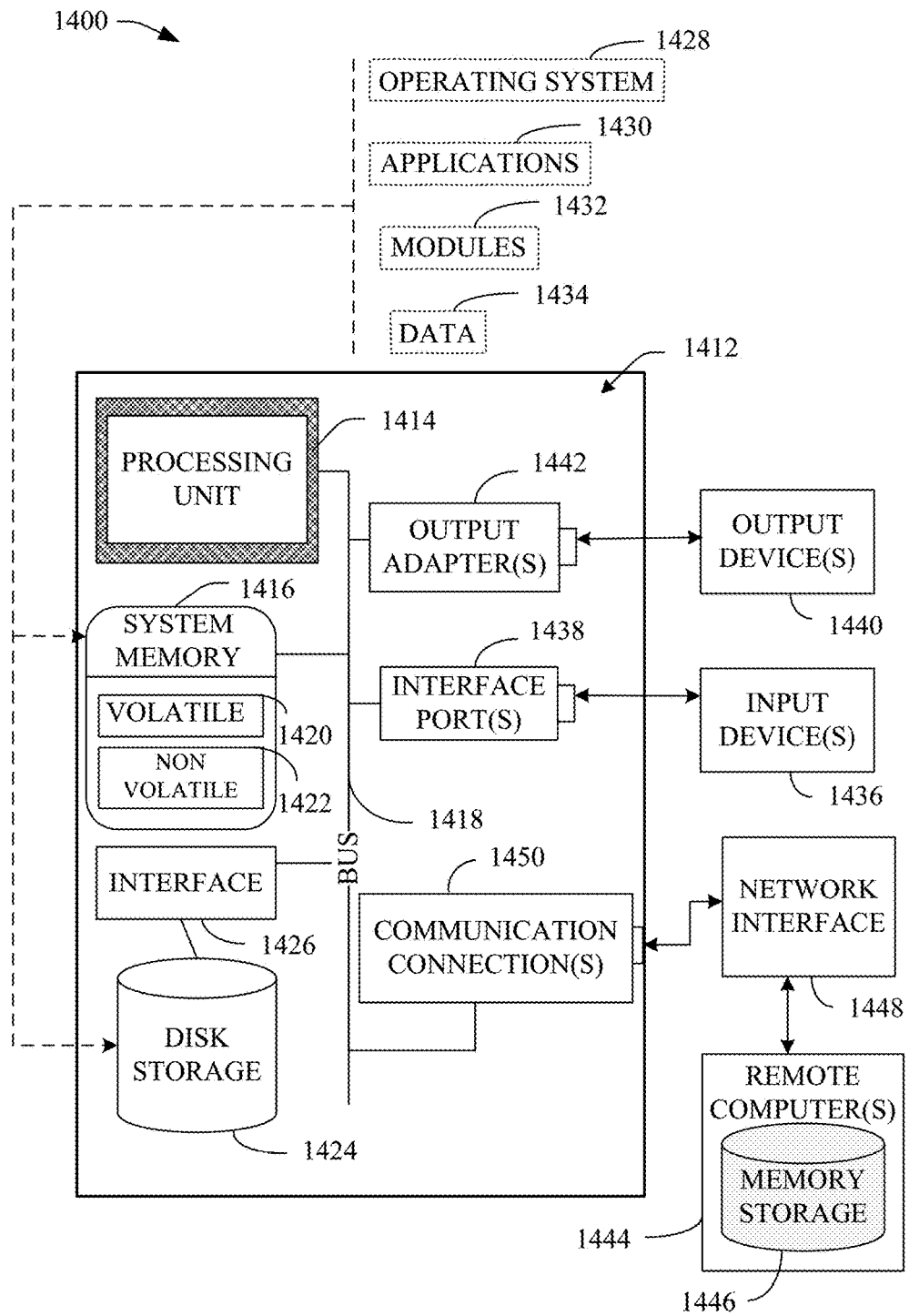
FIG. 14 is a schematic block diagram illustrating a suitable operating environment.
Figure 15:
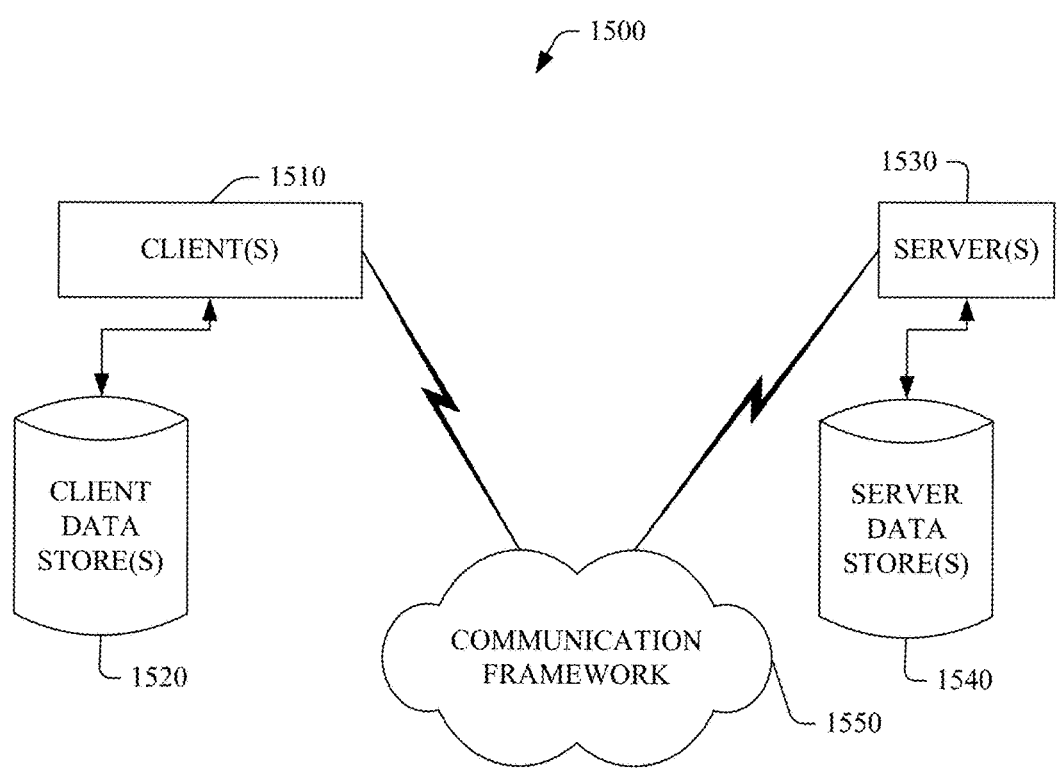
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 14, a suitable environment 1400 for implementing various aspects of the claimed subject matter includes a computer 1412. The computer 1412 includes a processing unit 1414, a system memory 1416, and a system bus 1418. It is to be appreciated that the computer 1412 can be used in connection with implementing one or more of the systems or components (e.g., HGC, hologram processor component, display component, processor component, data store, etc.) shown and/or described in connection with, for example, FIGS. 1-21. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also can include removable/non-removable, volatile/non-volatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426).

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 with which the subject disclosure can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the subject disclosure, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1520 that can be employed to store information local to the client(s) 1510. Similarly, the server(s) 1530 are operatively connected to one or more server data store(s) 1540 that can be employed to store information local to the servers 1530.

It is to be appreciated and understood that components (e.g., holographic cryptographic component, display component, encoder component, decoder component, processor component, data store, or other component(s)), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory that stores executable components; and
   at least one processor, coupled to the at least one memory, that executes or facilitates execution of the executable components, the executable components comprising:
      an image generator component that generates a first image that comprises a scaled source image and random content, wherein a source image is modified to generate the scaled source image, and wherein the random content is inserted in one or more locations within the first image that is or are not occupied by the scaled source image; and a holographic cryptographic component that generates a complex hologram that represents the scaled source image and the random content of the first image, converts the complex hologram to a phase hologram that represents the scaled source image and the random content of the first image, and encrypts the phase hologram using a random phase mask as a private encryption key, wherein the holographic cryptographic component generates the random phase mask and associates the random phase mask with the phase hologram to encrypt the phase hologram to generate an encrypted hologram.

2. The system of claim 1, wherein the holographic cryptographic component modifies respective dimensions of the source image by respective random scaling factors to generate the scaled source image.

3. The system of claim 1, wherein the holographic cryptographic component inserts the scaled source image in a random location within the first image.

4. The system of claim 3, wherein the holographic cryptographic component generates the random content and inserts the random content in only the one or more locations within the first image that are not occupied by the scaled source image.

5. The system of claim 1, wherein the holographic cryptographic component generates the complex hologram, comprising a magnitude portion and a phase portion, and converts the complex hologram to the phase hologram, comprising the phase portion.

6. The system of claim 5, wherein the phase hologram is a phase-only hologram.

7. The system of claim 1, wherein the holographic cryptographic component applies the random phase mask to the phase hologram to encrypt the phase hologram to generate the encrypted hologram.

8. The system of claim 1, wherein the encrypted hologram is able to be decrypted to generate a decrypted hologram by association of a conjugate phase mask with the encrypted hologram, and at least a reconstructed source image is able to be generated by illuminating the decrypted hologram with a coherent light beam, wherein the conjugate phase mask is a conjugate of the random phase mask, and the reconstructed source image corresponds to the source image.

9. The system of claim 1, wherein the source image is a two-dimensional or a three-dimensional source image, and the first image is a two-dimensional or a three-dimensional first image.

10. A system, comprising:
at least one memory that stores executable components; and
at least one processor, coupled to the at least one memory, that executes or facilitates execution of the executable components, the executable components comprising:
a holographic cryptographic component that receives an encrypted hologram associated with a source image and decrypts the encrypted hologram to generate a decrypted hologram based at least in part on a conjugate phase mask, wherein the encrypted hologram is based at least in part on a complex hologram that represents a first image that comprises a scaled source image and a set of random content, wherein the complex hologram is converted to the phase hologram that represents the scaled source image and the set of random content of the first image, wherein the source image is adjusted in size to generate the scaled source image, wherein the set of random content is inserted in a set of locations within the first image that is not occupied by the scaled source image, and wherein the conjugate phase mask inversely corresponds to a random phase mask used to encrypt the phase hologram to generate the encrypted hologram; and a display component that presents a reconstructed source image that is generated in response to illumination of at least a portion of the decrypted hologram using a coherent light beam.

11. The system of claim 10, wherein the holographic cryptographic component associates the conjugate phase mask with the encrypted hologram to facilitate decryption of the encrypted hologram.

12. The system of claim 11, wherein to associate the conjugate phase mask with the encrypted hologram, the holographic cryptographic component overlays, applies, or multiplies, the conjugate phase mask on, to, or by the encrypted hologram to facilitate the decryption of the encrypted hologram.

13. The system of claim 10, wherein the display component comprises a phase-only display device.

14. The system of claim 13, wherein the display component comprises at least one of a phase-only spatial light modulator display device, a phase-only liquid crystal on silicon display device, or a phase-only liquid crystal display device.

15. The system of claim 10, wherein the source image is a two-dimensional or a three-dimensional source image, and the first image is a two-dimensional or a three-dimensional first image.

16. A method, comprising:
generating, by a system comprising a processor, a complex hologram that represents a randomized global image, wherein the randomized global image comprises a modified source image and a set of random content, and wherein the set of random content is placed in one or more random locations of the randomized global image that do not occupy an area of the randomized global image that is occupied by the modified source image;
converting, by the system, the complex hologram that represents the randomized global image to a phase hologram that represents the randomized global image; and
encrypting, by the system, the phase hologram based at least in part on a random phase mask, wherein the random phase mask is associated with the phase hologram to encrypt the phase hologram to generate an encrypted hologram.

17. The method of claim 16, further comprising:
generating, by the system, the random phase mask based at least in part on a defined randomizing function; and
associating, by the system, the random phase mask with the phase hologram to facilitate the encrypting of the phase hologram, wherein the random phase mask is used as a private encryption key with respect to the encrypting of the phase hologram.

18. The method of claim 16, further comprising:
modifying, by the system, at least one dimension of the source image to generate the modified source image;
generating, by the system, a global image that is larger in size than at least the modified source image; and
incorporating, by the system, the modified source image within the global image at a different random location in the global image than the one or more random locations occupied by the set of random content to facilitate generating the randomized global image.

19. The method of claim 18, further comprising:
generating, by the system, the set of random content based at least in part on a defined randomizing function;
incorporating, by the system, the set of random content within the global image at the one or more random locations in the global image to facilitate the generating of the randomized global image, wherein the one or more other random locations only occupy one or more other areas of the randomized global image that do not overlap the area of the randomized global image that is occupied by the modified source image, and wherein the area associated with the modified source image comprises a subset of pixels of the randomized global image and the one or more other areas associated with the set of random content comprise a subset of other pixels that are not part of the subset of pixels.

20. The method of claim 19, wherein the set of random content comprises at least one of a random alphanumeric character, a random shape, a random image, or a random object.

21. The method of claim 16, wherein the generating the complex hologram comprises generating the complex hologram, comprising a magnitude portion and a phase portion; and
modifying, by the system, the complex hologram to facilitate generating the phase hologram, comprising the phase portion, wherein a first subset of pixels of the complex hologram that represents the modified source image and a second subset of pixels of the complex hologram that represents the set of random content are modified to facilitate generating the phase hologram.

22. The method of claim 21, wherein the phase hologram is a phase-only hologram.

23. The method of claim 16, further comprising:
communicating, by the system, the encrypted hologram, wherein the encrypted hologram is decryptable to generate a decrypted hologram by associating a conjugate phase mask with the encrypted hologram, wherein at least a reconstructed source image corresponding to the source image is able to be generated by illuminating the decrypted hologram with a coherent light beam, and wherein the conjugate phase mask inversely corresponds to the random phase mask.

24. The method of claim 16, wherein the source image is a two-dimensional or a three-dimensional source image, and the first image is a two-dimensional or a three-dimensional first image.

25. A non-transitory computer-readable medium storing computer-executable instructions that, in response to execution, cause a system comprising a processor to perform operations, comprising:
generating a global image that comprises a modified source image and a set of random content, wherein a source image is modified in size in at least one dimension to generate the modified source image, wherein the modified source image is randomly located in a first location within the global image, wherein the set of random content is located in one or more other locations within the global image that do not occupy or overlap the first location, and wherein the first location comprises a first subset of pixels of the global image and the one or other locations comprise a second subset of pixels of the global image that are different pixels from the first subset of pixels;
generating a complex hologram that represents the global image, wherein a first subset of hologram pixels of the complex hologram represents the modified source image and a second subset of hologram pixels of the complex hologram represents the set of random content;
generating a phase-only hologram that represents the global image based at least in part on converting the complex hologram, comprising the first subset of hologram pixels and the second subset of hologram pixels, to the phase-only hologram; and
encrypting the phase-only hologram, based at least in part on a random phase mask, wherein the random phase mask is associated with the phase-only hologram to encrypt the phase-only hologram to generate an encrypted hologram.

26. The non-transitory computer-readable medium of claim 25, wherein the operations further comprise:
generating the random phase mask based at least in part on a defined randomizing function; and
applying the random phase mask to the phase-only hologram to facilitate the encrypting of the phase-only hologram, wherein the random phase mask is used as a secret encryption key with respect to the encrypting of the phase-only hologram.

27. A system, comprising:
means for generating a first image that comprises a modified source image and a set of random content, wherein a source image is adjusted in size to generate the modified source image, wherein the modified source image is randomly located in a first location within the first image, and wherein the set of random content is located in one or more other locations within the first image that do not occupy or overlap the first location;
means for generating a complex hologram that represents the first image, wherein a first subset of complex pixels of the complex hologram represents the modified source image and a second subset of complex pixels of the complex hologram represents the set of random content;
means for generating a phase hologram that represents the first image based at least in part on the complex hologram, wherein the first subset of complex pixels and the second subset of complex pixels of the complex hologram are processed to facilitate generating the phase hologram; and
means for encrypting the phase hologram, based at least in part on a random phase mask, wherein the random phase mask is associated with the phase hologram to encrypt the phase hologram to generate an encrypted hologram.

28. The system of claim 27, wherein the means for generating the phase hologram comprises means for generating the random phase mask based at least in part on a defined randomizing function, wherein the system further comprises means for applying the random phase mask to the phase hologram to facilitate the encrypting of the phase hologram, and wherein the random phase mask is used as a private encryption key in connection with the encrypting of the phase hologram.

* * * * *